United States Patent
Hoshii

(10) Patent No.: US 11,102,377 B2
(45) Date of Patent: *Aug. 24, 2021

(54) RECORDING DEVICE FOR RECORDING RECORDING IMAGE BY NOZZLE SET RECIPROCATING RELATIVE TO RECORDING MEDIUM, IMAGE PROCESSING DEVICE FOR GENERATING RECORDING DATA FOR RECORDING RECORDING IMAGE BY NOZZLE SET RECIPROCATING RELATIVE TO RECORDING MEDIUM AND RECORDING METHOD FOR RECORDING RECORDING IMAGE BY NOZZLE SET RECIPROCATING RELATIVE TO RECORDING MEDIUM

(71) Applicant: SEIKO EPSON CORPORATION, Tokyo (JP)

(72) Inventor: Jun Hoshii, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/517,823

(22) Filed: Jul. 22, 2019

(65) Prior Publication Data

US 2020/0036862 A1 Jan. 30, 2020

(30) Foreign Application Priority Data

Jul. 24, 2018 (JP) .............................. JP2018-138211

(51) Int. Cl.
*H04N 1/405* (2006.01)
*H04N 1/024* (2006.01)
(Continued)

(52) U.S. Cl.
CPC ............ *H04N 1/4055* (2013.01); *B41J 2/145* (2013.01); *B41J 2/205* (2013.01); *B41J 2/21* (2013.01);
(Continued)

(58) Field of Classification Search
CPC .... H04N 1/034; H04N 1/0402; H04N 1/0408; H04N 1/0411; H04N 1/0414;
(Continued)

(56) References Cited

U.S. PATENT DOCUMENTS 5,706,043 A 1/1998 Okada et al.
6,505,905 B1 * 1/2003 Krouss ................... B41J 2/2054
347/15

(Continued)

FOREIGN PATENT DOCUMENTS

EP 1679192 A1 7/2006
JP 2001-047614 A 2/2004
(Continued)

*Primary Examiner* — Scott A Rogers
(74) *Attorney, Agent, or Firm* — Global IP Counselors, LLP

(57) ABSTRACT

A recording system for recording a recording image based on image data by repeating a pass operation in which a nozzle column discharges ink while reciprocating relatively to a recording medium in a main scanning direction to form dots on the recording medium, and a conveying operation of relatively moving the nozzle column and the recording medium in a sub-scanning direction crossing the main scanning direction, the recording system including an assigning section for obtaining a plurality of halftone data which is generated with respect to the same area of the image data based on the image data, and which corresponds to the ink of a predetermined color, and then assigning each of the halftone data obtained to the pass operations in the (Continued)

same direction in reciprocation in the main scanning direction in a predetermined recording area.

10 Claims, 19 Drawing Sheets

(51) Int. Cl.
| | |
|---|---|
| H04N 1/207 | (2006.01) |
| B41J 2/145 | (2006.01) |
| H04N 1/401 | (2006.01) |
| H04N 1/034 | (2006.01) |
| H04N 1/04 | (2006.01) |
| H04N 1/52 | (2006.01) |
| H04N 1/195 | (2006.01) |
| B41J 2/21 | (2006.01) |
| B41J 2/205 | (2006.01) |

(52) U.S. Cl.
CPC ......... *H04N 1/02418* (2013.01); *H04N 1/034* (2013.01); *H04N 1/0408* (2013.01); *H04N 1/0455* (2013.01); *H04N 1/195* (2013.01); *H04N 1/207* (2013.01); *H04N 1/4015* (2013.01); *H04N 1/52* (2013.01)

(58) Field of Classification Search
CPC ...... H04N 1/0455; H04N 1/10; H04N 1/1008; H04N 1/19–19594; H04N 1/40025; H04N 1/40031; H04N 1/40087; H04N 1/405–4058; H04N 1/52; H04N 1/56; H04N 1/60; H04N 1/6027; B41J 2/205–2146; B41J 2/52; B41J 2/525; G06K 15/102; G06K 15/105; G06K 15/107; G06K 15/1876; G06K 15/1877; G06K 15/1878; G06K 15/188; G06K 15/1881

See application file for complete search history.

(56) References Cited

U.S. PATENT DOCUMENTS

| | | | |
|---|---|---|---|
| 7,570,402 B2 | 8/2009 | Yoshida | |
| 9,144,994 B2* | 9/2015 | Sudo | B41J 2/2107 |
| 9,180,682 B2* | 11/2015 | Fukazawa | B41J 2/2139 |
| 9,296,230 B2 | 3/2016 | Komamiya et al. | |
| 9,827,794 B2* | 11/2017 | Miyamoto | B41J 2/2135 |
| 10,414,167 B2* | 9/2019 | Yoshikawa | B41J 2/04558 |
| 2007/0046725 A1 | 3/2007 | Hoshiyama et al. | |
| 2007/0121130 A1 | 5/2007 | Yoshida | |
| 2014/0176966 A1 | 6/2014 | Kuno | |
| 2015/0286905 A1* | 10/2015 | Kikuta | G06K 15/1881 358/1.8 |
| 2016/0279927 A1* | 9/2016 | Miyamoto | B41J 19/145 |

FOREIGN PATENT DOCUMENTS

| | | |
|---|---|---|
| JP | 2008-162151 A | 7/2008 |
| JP | 2009-137247 A | 6/2009 |

* cited by examiner

RECORDING DEVICE FOR RECORDING RECORDING IMAGE BY NOZZLE SET RECIPROCATING RELATIVE TO RECORDING MEDIUM, IMAGE PROCESSING DEVICE FOR GENERATING RECORDING DATA FOR RECORDING RECORDING IMAGE BY NOZZLE SET RECIPROCATING RELATIVE TO RECORDING MEDIUM AND RECORDING METHOD FOR RECORDING RECORDING IMAGE BY NOZZLE SET RECIPROCATING RELATIVE TO RECORDING MEDIUM

The present application is based on, and claims priority from JP Application Serial Number 2018-138211, filed Jul. 24, 2018, the disclosure of which is hereby incorporated by reference herein in its entirety.

BACKGROUND

1. Technical Field

The present disclosure relates to a recording device for discharging a liquid to perform recording, an image processing device for generating recording data for making a recording device perform recording, and a recording method for discharging a liquid to perform recording.

2. Related Art

A serial type inkjet printer alternately repeats a pass operation of discharging ink droplets to a recording medium (a print medium) while reciprocating (performing main scanning with) a head provided with a nozzle column for discharging the ink droplets in a main scanning direction, and a conveying operation of moving (performing sub-scanning with) the recording medium in a conveying direction (a sub-scanning direction) crossing the main scanning direction to thereby form dots (a dot column) arranged in the main scanning direction so as to be arranged in the conveying direction to form an image on the recording medium.

In such an inkjet printer, a method of increasing the number of nozzles has been adopted as one of the methods for further increasing the recording speed. Specifically, there is cited a method of increasing the number of nozzles per head, or arranging a plurality of heads to thereby increase the number of dots formed with a single main scanning (pass operation) to thereby increase the recording speed.

When arranging a plurality of heads to be formed as a single head, if there is a difference (a variation in ink discharge amount or discharge direction) in the ink discharge characteristic between the individual heads thus arranged, the recording quality is affected by the difference in some cases, for example, the sizes or the positions of the dots to be formed are varied, and thus, the color variation becomes conspicuous. To cope with the above, in JP-A-2001-47614 (Document 1), there is described an inkjet recording device provided with a drive waveform generation data correction unit capable of correcting the variation in ink discharge amount or the discharge timing.

However, in the inkjet recording device described in Document 1, since it is necessary to perform correction in accordance with the ink discharge characteristic of the individual head, it is necessary to provide the drive waveform generation data correction unit for each head, and thus, there is a problem that this causes an impediment to reduction in cost. Further, it is necessary to obtain a correction amount according to the ink discharge characteristic of the individual head, and there is a problem that it takes time for the adjustment.

Further, in the recording of characters, rules and so on, there is a problem that an increase in the number of times of the pass operation does not necessarily lead to an improvement in image quality (visibility as the characters and line quality of the rules). Specifically, in the pass operation, there is a problem that the visibility as the characters and the line quality of the rules deteriorate in some cases due to dot displacement caused by a difference in moving direction when the head reciprocates.

SUMMARY

A recording device according to an aspect of the present disclosure is a recording device configured to record a recording image based on image data by repeating a pass operation in which a nozzle set discharges a liquid while reciprocating relatively to a recording medium in a main scanning direction to form dots on the recording medium, and a conveying operation of relatively moving the nozzle set and the recording medium in a sub-scanning direction crossing the main scanning direction, the recording device including an assigning section configured to obtain a plurality of halftone data which is generated with respect to a same area of the image data based on the image data, and which corresponds to the liquid of a predetermined color, and then assign each of the halftone data obtained to the pass operations in a same direction in reciprocation in the main scanning direction in a predetermined recording area.

The recording device described above may further include a halftone processing section configured to generate the plurality of halftone data.

In the recording device described above, the nozzle set may be constituted by a plurality of nozzle groups, the assigning section may assign each of the halftone data to the pass operations throughout a whole of a same area of the image data by at least one nozzle group out of the plurality of nozzle groups, and the recording image may be recorded by overlapping recordings based on the respective halftone data.

In the recording device described above, the predetermined recording area may be an area in which the nozzle group configured to discharge the liquid of the predetermined color is configured to perform recording with the pass operation not accompanied by the conveying operation.

The recording device described above may further include an input section configured to designate a length in the sub-scanning direction of the predetermined recording area.

The recording device described above may further include a second nozzle set configured to discharge a liquid of a second color different from the predetermined color, wherein the assigning section may obtain a second halftone datum which is generated with respect to a same area of the image data based on the image data, and which corresponds to the liquid of the second color, and then may assign the second halftone datum to the pass operations in one of a same direction, and a outward path direction and a return path direction in the reciprocation in the main scanning direction of the second nozzle set.

In the recording device described above, the assigning section may assign the second halftone datum to the pass operations in a same direction in the reciprocation in the main scanning direction of the second nozzle set in the predetermined recording area when an intensity of a contrast between a color of the recording medium and the second color is higher than an intensity of a contrast between the color of the recording medium and the predetermined color.

The recording device described above may further include an input section configured to designate the predetermined color.

An image processing device according to an aspect of the present disclosure is an image processing device configured to generate recording data for making a recording device perform recording based on image data, the recording device being configured to record a recording image based on the image data by repeating a pass operation in which a nozzle set discharges a liquid while reciprocating relatively to a recording medium in a main scanning direction to form dots on the recording medium, and a conveying operation of relatively moving the nozzle set and the recording medium in a sub-scanning direction crossing the main scanning direction, the image processing device including a halftone processing section configured to generate a plurality of halftone data corresponding to the liquid of a predetermined color with respect to a same area of the image data based on the image data, and an assigning section configured to assign each of the halftone data to the pass operations in a same direction in reciprocation in the main scanning direction in a predetermined recording area.

A recording method according to an aspect of the present disclosure is a recording method in a recording device configured to record a recording image based on image data by repeating a pass operation in which a nozzle set discharges a liquid while reciprocating relatively to a recording medium in a main scanning direction to form dots on the recording medium, and a conveying operation of relatively moving the nozzle set and the recording medium in a sub-scanning direction crossing the main scanning direction, the recording method including a halftone processing process of generating a plurality of halftone data corresponding to the liquid of a predetermined color with respect to a same area of the image data based on the image data, and an assigning process of assigning each of the halftone data to the pass operations in a same direction in reciprocation in the main scanning direction in a predetermined recording area.

DESCRIPTION OF AN EXEMPLARY EMBODIMENT

Figure 1:
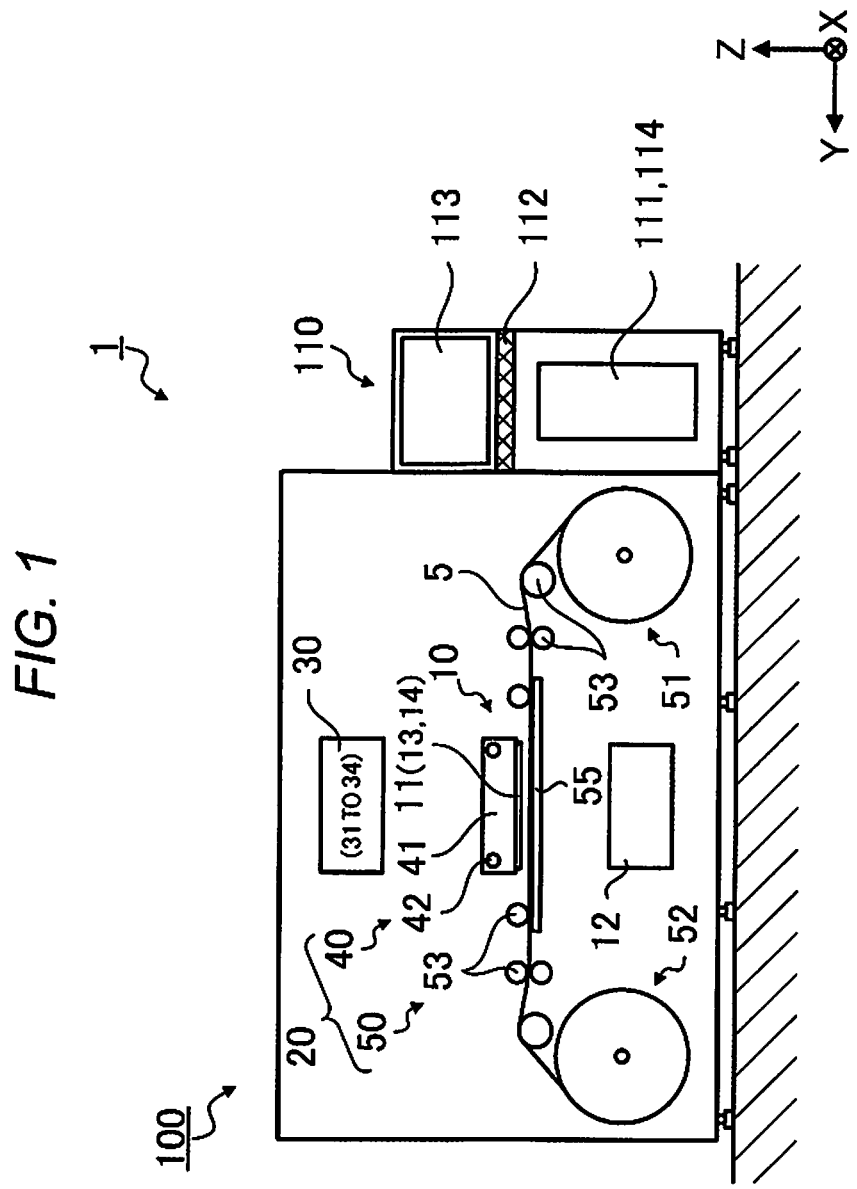
FIG. 1 is a front view showing a configuration of a recording device according to Embodiment 1.

An embodiment of the present disclosure will hereinafter be described with reference to the accompanying drawings. The following is an embodiment of the present disclosure, and does not limit the present disclosure. It should be noted that in each of the drawings described below, description with scales different from those in the actual configuration is used in some cases for making the explanation easy to understand. Further, in the coordinate additionally described in the drawings, it is assumed that a Z-axis direction corresponds to a vertical direction, a +Z direction corresponds to an upward direction, an X-axis direction corresponds to an anteroposterior direction, a −X direction corresponds to a frontward direction, a Y-axis direction corresponds to a horizontal direction, a +Y direction corresponds to a leftward direction, and an X-Y plane corresponds to a horizontal surface.

Embodiment 1

Figure 2:
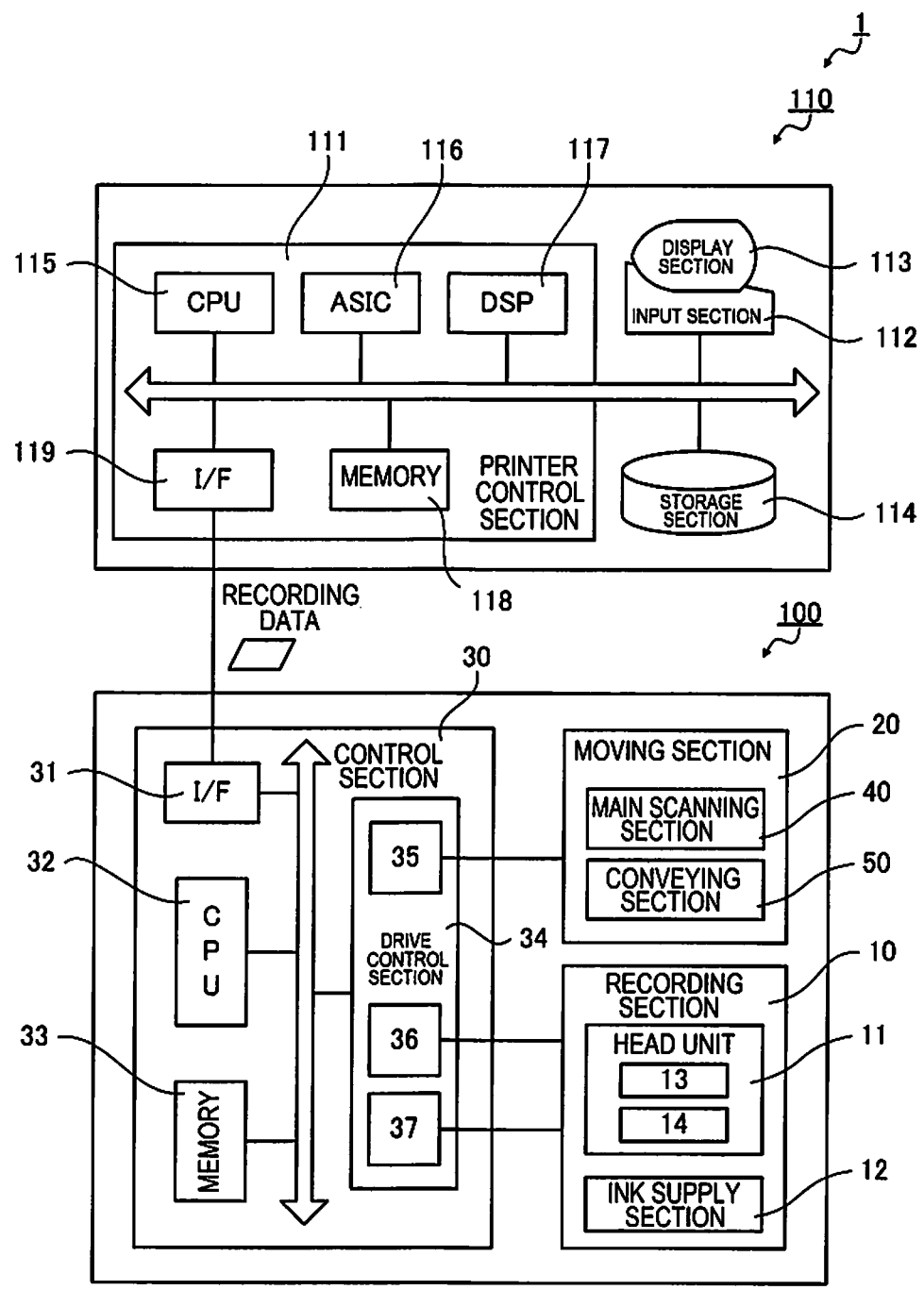
FIG. 2 is a block diagram showing a configuration of the recording device according to Embodiment 1.

FIG. 1 is a front view showing a configuration of a recording system 1 as a "recording device" according to Embodiment 1, and FIG. 2 is a block diagram thereof.

The recording system 1 is constituted by a printer 100, and an image processing device 110 to be coupled to the printer 100. The printer 100 is an inkjet printer for recording a desired image on a recording medium 5 having an elongated shape to be supplied in a rolled state based on recording data to be received from the image processing device 110.

As the recording medium 5, it is possible to use, for example, high-quality paper, cast-coated paper, art paper, coated paper and synthetic paper. Further, the recording medium 5 is not limited to such paper, but it is also possible to use, for example, cloth or a film made of polyethylene terephthalate (PET), polypropylene (PP) or the like. It should be noted that in the present embodiment, there is described the case in which the recording surface of the recording medium 5 is white as an example.

Basic Configuration of Image Processing Device

The image processing device 110 is provided with a printer control section 111, an input section 112, a display section 113, a storage section 114 and so on, and controls the recording job of making the printer 100 perform recording. The image processing device 110 is configured using a personal computer as a preferred example.

The software with which the image processing device 110 operates includes ordinary image processing application software (hereinafter referred to as an application) for handling the image data to be recorded, and printer driver software (hereinafter referred to as a printer driver) for controlling the printer 100, and generating recording data for making the printer 100 perform recording.

In other words, the image processing device 110 generates the recording data for making the printer 100 record a recording image based on the image data.

It should be noted that the printer driver is not limited to the example of being configured as a functional section by the software, but can also be formed of, for example, firmware. The firmware is installed in, for example, an SOC (system on chip) in the image processing device 110.

The printer control section 111 is provided with a CPU 115, an ASIC 116, a DSP 117, a memory 118, a printer interface section (I/F) 119 and so on, and performs central control of the whole of the recording system 1.

The input section 112 is an information input unit as a human interface. Specifically, for example, a keyboard, a mouse pointer, or a port to which information input equipment is coupled.

The display section 113 is an information display unit (a display) as a human interface, and displays information input from the input section 112, an image to be recorded on the printer 100, information related to the recording job and so on under the control by the printer control section 111.

The storage section 114 is a rewritable storage medium such as a hard disk drive (HDD) or a memory card, and stores the software (a program running in the printer control section 111) with which the image processing device 110 operates, an image to be recorded, information related to the recording job and so on.

The memory 118 is a recording medium for keeping an area for storing the program with which the CPU 115 operates, and a working area in which the CPU 115 operates, and is formed of a storage element such as a RAM or an EEPROM.

Basic Configuration of Printer 100

The printer 100 is constituted by a recording section 10, a moving section 20, a control section 30 and so on. The printer 100 having received the recording data from the image processing device 110 controls the recording section 10 and the moving section 20 using the control section 30 based on the recording data to record an image (perform image formation) on the recording medium 5.

The recording data is image forming data obtained by performing a conversion process on the image data by the application and the printer driver provided to the image processing device 110 so as to be able to be recorded by the printer 100, and includes a command for controlling the printer 100.

The image data includes, for example, ordinary full-color image information (e.g., RGB data) obtained by a digital camera or the like, and text information.

The recording section 10 is constituted by a head unit 11, an ink supply section 12 and so on.

The moving section 20 is constituted by a main scanning section 40, a conveying section 50 and so on. The main scanning section 40 is constituted by a carriage 41, a guide shaft 42, a carriage motor (not shown) and so on. The conveying section 50 is constituted by a supply section 51, a housing section 52, conveying rollers 53, a platen 55 and so on.

The head unit 11 is provided with a recording head 13 having a plurality of nozzles (a nozzle set) for discharging recording ink (hereinafter referred to as ink) which is a "liquid" as ink droplets, and a head control section 14. The head unit 11 is mounted on the carriage 41, and reciprocates in a main scanning direction (the X-axis direction shown in FIG. 1) together with the carriage 41 moving in the main scanning direction. By the head unit 11 (the recording head 13) discharging ink droplets on the recording medium 5 supported by the platen 55 under the control by the control section 30 while moving in the main scanning direction, a dot column (a raster line) along the main scanning direction is formed on the recording medium 5.

The ink supply section 12 is provided with an ink tank, an ink supply path (not shown) for supplying the ink from the ink tank to the recording head 13, and so on.

As the ink, there can be cited, fir example, a four-color ink set obtained by adding black (K) to a three-color ink set of cyan (C), magenta (M) and yellow (Y) as an ink set made of concentrated ink compositions. Further, there can be cited, for example, an eight-color ink set obtained by adding an ink set of light cyan (Lc), light magenta (Lm), light yellow (Ly) and light black (Lk) made of pastel ink compositions obtained by diluting the concentration of each of the color materials. The ink tank, the ink supply path, and an ink supply channel to the nozzles for discharging the same ink are independently disposed for each ink.

As the method (inkjet method) of discharging the ink droplets, there is used a piezoelectric method. The piezoelectric method is a method of applying the pressure corresponding to a recording information signal to the ink retained in a pressure chamber using a piezoelectric element (a piezo element) to jet (discharge) ink droplets from nozzles communicated with the pressure chamber to thereby perform recording.

It should be noted that the method of discharging ink droplets is not limited to the above, but can also be other recording methods for jetting the ink as droplets to form dot group on a recording medium. It is also possible to adopt, for example, a method of continuously jetting ink as a droplet from a nozzle with an intense electric field between the nozzle and an acceleration electrode disposed in front of the nozzle, and then applying the recording information signal from a deflection electrode while the ink droplet is flying to thereby perform recording, a method (an electrostatic suction method) of jetting an ink droplet in accordance with the recording information signal without deflecting the ink droplet, a method of mechanically vibrating a nozzle with a quartz crystal resonator to thereby forcibly jet the ink droplet, and a method (a thermal jet method) of heating to bubble the ink with a microscopic electrode in accordance with the recording information signal to thereby jet an ink droplet to perform recording.

The moving section 20 (the main scanning section 40, the conveying section 50) moves the head unit 11 (the recording head 13) and the recording medium 5 relatively to each other under the control by the control section 30.

The guide shaft 42 extends in the main scanning direction to support the carriage 41 in a slidable state, and further, the carriage motor acts as a drive source when reciprocating the carriage 41 along the guide shaft 42. In other words, the main scanning section 40 (the carriage 41, the guide shaft 42 and the carriage motor) moves the carriage 41 (namely, the recording head 13) along the guide shaft 42 under the control by the control section 30.

The supply section 51 rotatably supports a reel having the recording medium 5 rolled to have a roll shape, and feeds the recording medium 5 to a conveying route. The housing section 52 rotatably supports the reel for winding the recording medium 5, and winds the recording medium 5 recording on which has been completed from the conveying route.

The conveying rollers 53 are constituted by drive rollers for moving the recording medium 5 in a sub-scanning direction (the Y-axis direction shown in FIG. 1) crossing the main scanning direction, driven rollers rotating due to the movement of the recording medium 5, and so on, and constitutes the conveying route for conveying the recording medium 5 from the supply section 51 to the housing section 52 via a recording area (an area in which the recording head 13 makes a main scanning move on an upper surface of the platen 55) of the recording section 10.

The control section 30 is provided with an interface section (I/F) 31, a CPU 32, a memory 33, a drive control section 34 and so on, and performs control of the printer 100.

The interface section 31 is coupled to the printer interface section 119 of the image processing device 110, and thus, transmission and reception of data are performed between the image processing device 110 and the printer 100. The image processing device 110 and the printer 100 can also be coupled directly to each other with a cable or the like, or can also be coupled in directly via a network or the like. Further, it is also possible to perform the transmission and reception of the data between the image processing device 110 and the printer 100 via wireless communication.

The CPU 32 is an arithmetic processing device for performing overall control of the printer 100.

The memory 33 is a recording medium for keeping an area for storing the program with which the CPU 32 operates, and a working area in which the CPU 32 operates, and is formed of a storage element such as a RAM or an EEPROM.

The CPU 32 controls the recording section 10 and the moving section 20 via the drive control section 34 in accordance with the program stored in the memory 33 and the recording data received from the image processing device 110.

The drive control section 34 controls the drive of the recording section 10 (the head unit 11, the ink supply section 12) and the moving section 20 (the main scanning section 40, the conveying section 50) based on the control by the CPU 32. The drive control section 34 is provided with a move control signal generation circuit 35, a discharge control signal generation circuit 36 and a drive signal generation circuit 37.

The move control signal generation circuit 35 is a circuit for generating a signal for controlling the moving section 20 (the main scanning section 40, the conveying section 50) in accordance with an instruction from the CPU 32.

The discharge control signal generation circuit 36 is a circuit for generating a head control signal for performing selection of the nozzle for discharging the ink, selection of the amount to be discharged, control of the discharge timing, and so on in accordance with an instruction from the CPU 32 based on the recording data.

The drive signal generation circuit 37 is a circuit for generating a basic drive signal including a drive signal for driving a piezoelectric element of the recording head 13.

The drive control section 34 selectively drives the piezoelectric elements corresponding respectively to the nozzles based on the head control signal and the basic drive signal.

Nozzle Column (Head)

Figure 3:
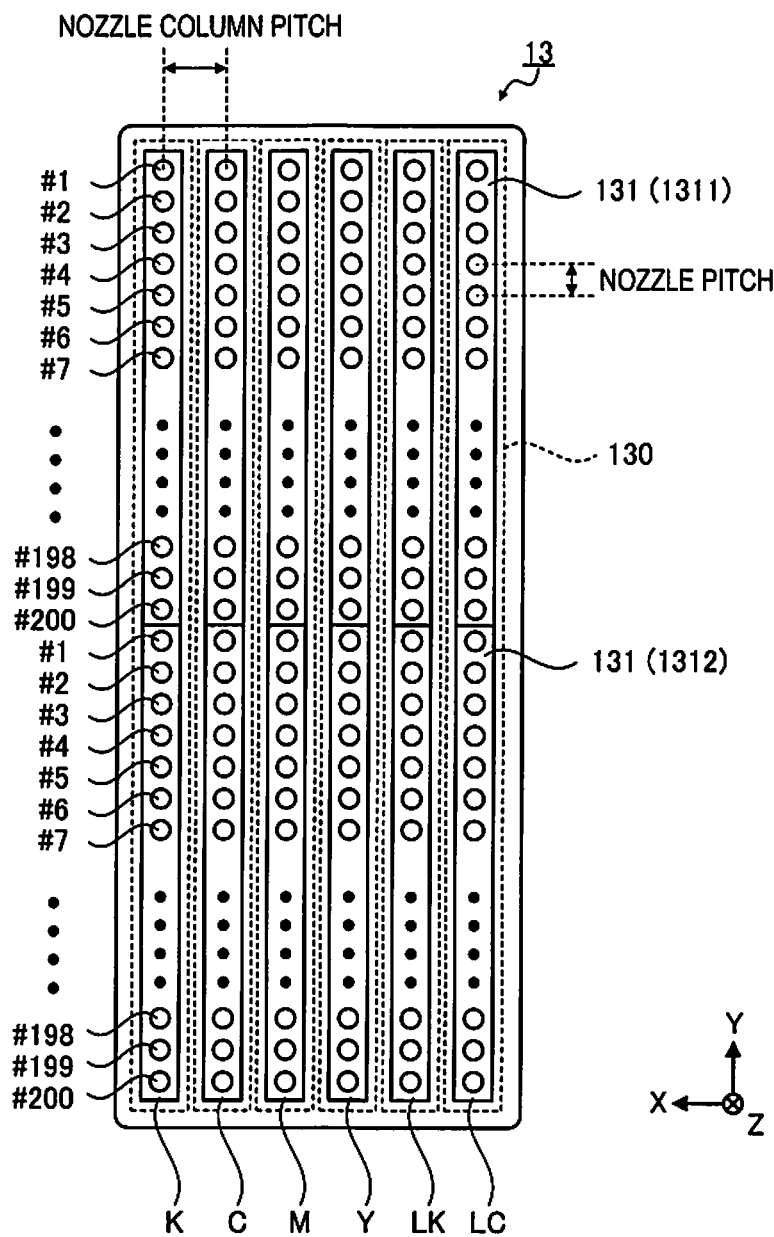
FIG. 3 is a schematic diagram showing an example of a nozzle arrangement viewed from a lower surface of a recording head.

FIG. 3 is a schematic diagram showing an example of a nozzle arrangement viewed from a lower surface of the recording head 13.

As shown in FIG. 3, the recording head 13 is provided with nozzle columns 130 (a black ink nozzle column K, a cyan ink nozzle column C, a magenta ink nozzle column M, a yellow ink nozzle column Y, a gray ink nozzle column LK, a light cyan ink nozzle column LC) having a plurality of nozzles for discharging respective colors of ink formed so as to be arranged side by side as six "nozzle sets." The nozzle columns 130 are arranged in a line along a direction (the X-axis direction) crossing the sub-scanning direction at regular intervals (at a nozzle column pitch) so as to be parallel to each other.

The nozzle column 130 is constituted by nozzle chips 131 (a nozzle chip 1311, a nozzle chip 1312) as two "nozzle groups" extending in the Y-axis direction and arranged in a row, and the nozzle chips 131 each have 200 nozzles, namely the nozzles #1 through #200, arranged in a line at regular intervals (at the nozzle pitch) along the sub-scanning direction (the Y-axis direction).

The nozzle chips 131 are each manufactured with an MEMS (micro electromechanical systems) manufacturing process using a semiconductor process using, for example, a silicon wafer as a basic material, and the 200 nozzles provided to the nozzle chip 131 constitute a nozzle group the same or similar in the ink discharge characteristic.

In other words, the recording head 13 constituting the "nozzle set" is constituted by the nozzle chips 131 as a plurality of "nozzle groups."

It should be noted that in the present embodiment, there is described an example in which black (K) high in contrast with respect to the recording medium 5 having a white recording surface is used as a "predetermined color." In other words, the black (K) ink discharged by the black ink nozzle column K corresponds to a "liquid of a predetermined color," the five nozzle columns 130 (the cyan ink nozzle column C, the magenta ink nozzle column M, the yellow ink nozzle column Y, the gray ink nozzle column LK and the light cyan ink nozzle column LC) other than the black ink nozzle column K each correspond to a "second nozzle set," and the five colors of ink discharged by these five nozzle columns 130 each correspond to a "liquid of a second color" different from the predetermined color.

Due to the configuration described above, by repeating the pass operation of discharging (providing) the ink droplets from the recording head 13 to the recording medium 5 supplied to the recording area by the conveying section 50 (the supply section 51, the conveying rollers 53) while moving the carriage 41 supporting the recording head 13 in the main scanning direction (the X-axis direction) along the guide shaft 42, and the conveying operation (a feed operation) of moving the recording medium 5 in the sub-scanning direction (the +Y direction) crossing the main scanning direction using the conveying section 50 (the conveying rollers 53), the control section 30 forms (records) a desired image on the recording medium 5.

Basic Function of Printer Driver in Related Art

Figure 4:
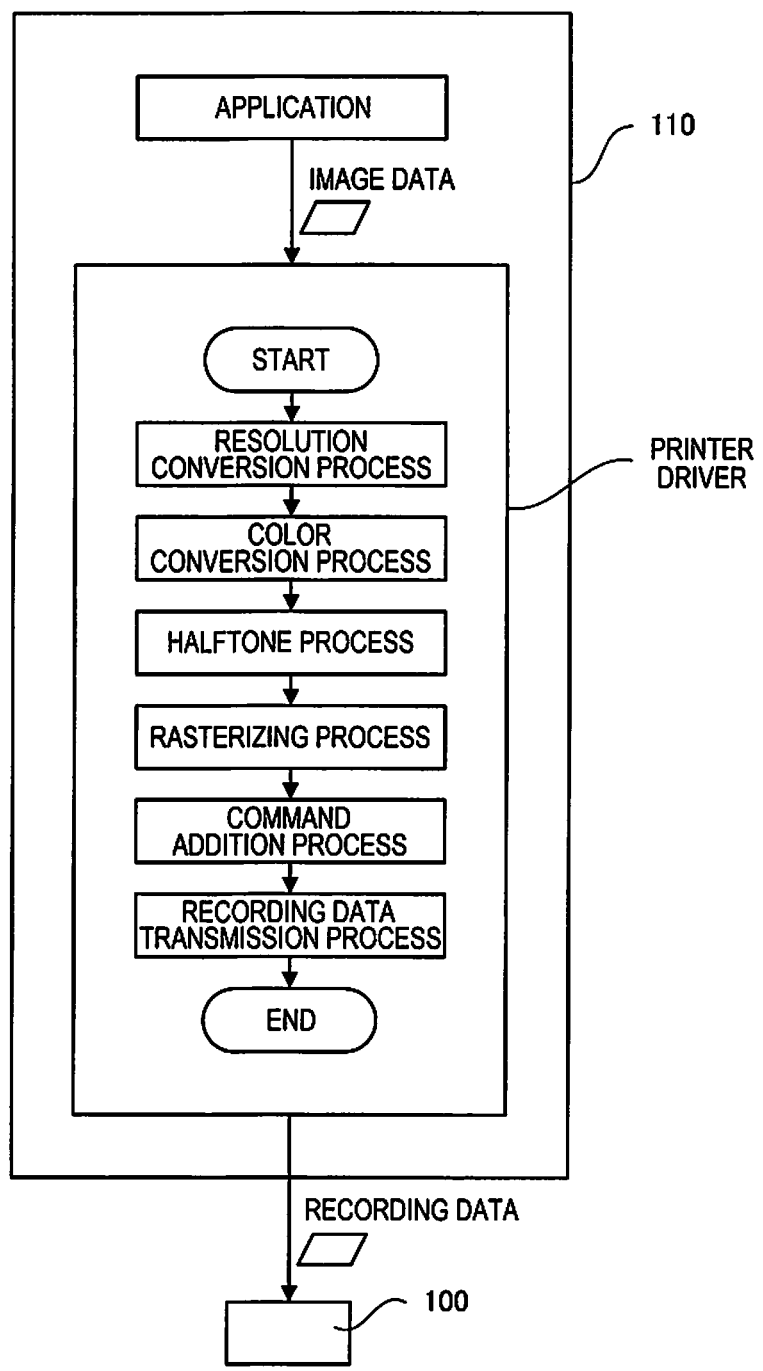
FIG. 4 is an explanatory diagram of a basic function of a printer driver in related art.

FIG. 4 is an explanatory diagram of a basic function of a printer driver in the related art.

Recording on the recording medium 5 is started by transmitting the recording data from the image processing device 110 to the printer 100. The recording data is generated by the printer driver.

A generation process of the recording data in the related art will hereinafter be described with reference to FIG. 4.

The printer driver receives the image data from the application, converts the image data into the recording data of a format which can be interpreted by the printer 100, and then outputs the recording data to the printer 100. When converting the image data from the application into the recording data, the printer driver performs a resolution conversion process, a color conversion process, a halftone process, a rasterizing process, a command addition process and so on.

The resolution conversion process is a process of converting the image data output from the application into the resolution (the recording resolution) when recording the recording data on the recording medium 5. For example, when the recording resolution is designated to 720×720 dpi, the image data of a vector format received from the application is converted into the image data of a bitmap format having the resolution of 720×720 dpi. Pixel data of the image data on which the resolution conversion process has been performed is constituted by pixels arranged in a matrix. Each of the pixels has a grayscale value of, for example, 256 grayscales in the RGB color space. In other words, the pixel data on which the resolution conversion has been performed represents the grayscale values of the corresponding pixels.

The pixel data corresponding to the pixels arranged in a predetermined direction forming a column out of the pixels arranged in a matrix is referred to as raster data. It should be noted that the predetermined direction in which the pixels corresponding to the raster data are arranged corresponds to the moving direction (the main scanning direction) of the recording head 13 when recording the image.

The color conversion process is a process of converting the RGB data into data in a CMYK color space. The CMYK color denotes cyan (C), magenta (M), yellow (Y) and black (K), and the image data in the CMYK color space is data corresponding to the colors of the ink the printer 100 has. Therefore, when the printer 100 uses 10 types of ink of the CMYK color system, the printer driver generates the image data in the ten-dimensional space of the CMYK color system.

The color conversion process is performed based on a table (a color conversion lookup table LUT) having the grayscale values of the RGB data and the grayscale values of the CMYK color system data correspond to each other. It should be noted that the pixel data on which the color conversion process has been performed is the CMYK color system data of, for example, 256 grayscales represented by the CMYK color space.

The halftone process is a process of converting the data in a large grayscale number (256 grayscales) into data in a grayscale number the printer 100 can form. Due to the halftone process, the data representing 256 grayscales is converted into a halftone datum for determining the formation state of a dot such as a 1-bit datum representing 2 grayscales (presence of the dot and absence of the dot), or a 2-bit datum representing 4 grayscales (no dot, a small dot, a middle dot and a large dot). Specifically, a generation rate (e.g., when 4 grayscales are used, the generation rate of each of no dot, the small dot, the middle dot and the large dot) of the dot corresponding to the grayscale value is obtained from a dot generation rate table having the grayscale values (0 through 255) and the dot generation rates correspond to each other, and then the pixel data is generated so that the dots are formed in a dispersed manner using a dither method, an error diffusion method or the like at the generation rate thus obtained. In such a manner, in the halftone process, there is generated the halftone datum for determining the formation state of the dots to be formed by the nozzle set discharging the ink of the same color.

The rasterizing process is a process of sorting the pixel data (e.g., the 1-bit or 2-bit halftone datum described above) arranged in a matrix in accordance with the dot formation order when performing recording. The rasterizing process includes an assigning process of assigning the image data constituted by the pixel datum (the halftone datum) on which the halftone process has been performed to the pass operations in which the recording head 13 (the nozzle column 130) discharges the ink droplets while making the main scanning move. When the assigning process has been completed, the pixel data arranged in a matrix is assigned to the actual nozzles for forming the raster lines constituting the recording image in each of the pass operations.

The command addition process is a process of adding a command data corresponding to the recording type to the data on which the rasterizing process has been performed. As the command data, there can be cited, for example, conveyance data related to the conveyance specification (the moving amount or the speed in the sub-scanning direction) of the recording medium 5.

These processes by the printer driver are performed by the ASIC 116 and the DSP 117 (see FIG. 2) under the control by the CPU 115, and the recording data thus generated is transmitted to the printer 100 via the printer interface section 119 by a recording data transmission process.

Correction of Recording Image in Related Art

Figure 5:
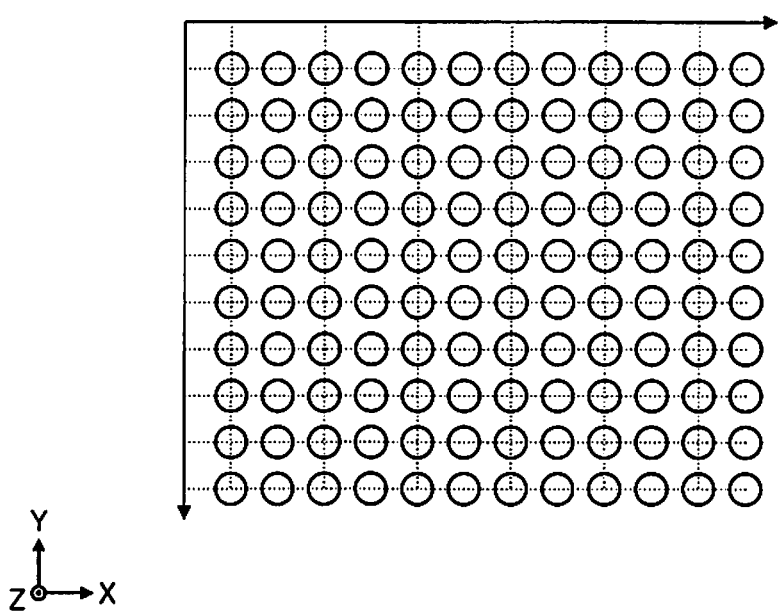
FIG. 5 is a conceptual diagram showing a matrix of a data space in which halftone datum is developed in a halftone process of the related art.

FIG. 5 is a conceptual diagram showing a matrix of a data space in which the halftone datum is developed in the halftone process of the related art. The 1-bit datum or the 2-bit datum corresponding to the formation state of the dots described above is developed at the positions indicated by the circles, and then the rasterizing process (the assigning process) is performed on the data to thereby perform the formation of the dots based on the halftone datum from the nozzles thus assigned.

Figure 6:
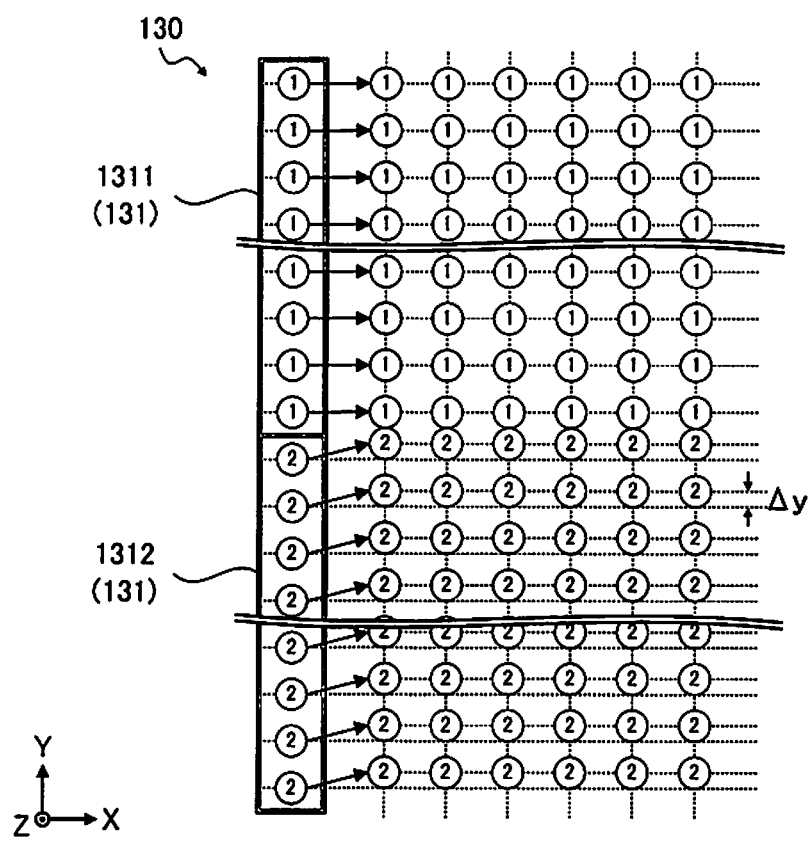
FIG. 6 is an explanatory diagram schematically showing an example when there is a difference in ink discharge characteristic between nozzle chips constituting a nozzle column, and a displacement occurs in a dot formation position.

FIG. 6 is an explanatory diagram schematically showing an example when there is a difference in the ink discharge characteristic between nozzle chips 131 constituting the nozzle column 130, and a displacement occurs in a dot formation position.

For example, when the dot positions formed by the nozzle chip 1312 is shifted as much as Δy in the +Y direction as indicated by the numeral of 2 in FIG. 6 with respect to the dot positions (the positions indicated by the numeral of 1 in FIG. 6) formed by the nozzle chip 1311, since there occurs a part in which the dot formed by the nozzle chip 1311 and the dot formed by the nozzle chip 1312 become in a dense state (close to each other) in the Y-axis direction, and a part in which the dots become in a nondense state (far from each other) in the Y-axis direction, a shading variation (banding) of the color is visually recognized in the image recorded in some cases.

Regarding such a displacement of the dots in the Y-axis direction (the sub-scanning direction), it is possible to correct the displacement of the dots by, for example, performing the recording by the nozzle chip 1311 and the recording by the nozzle chip 1312 in the different pass operations, and adjusting the conveyance amount (feed amount) between the pass operations.

Figure 7:
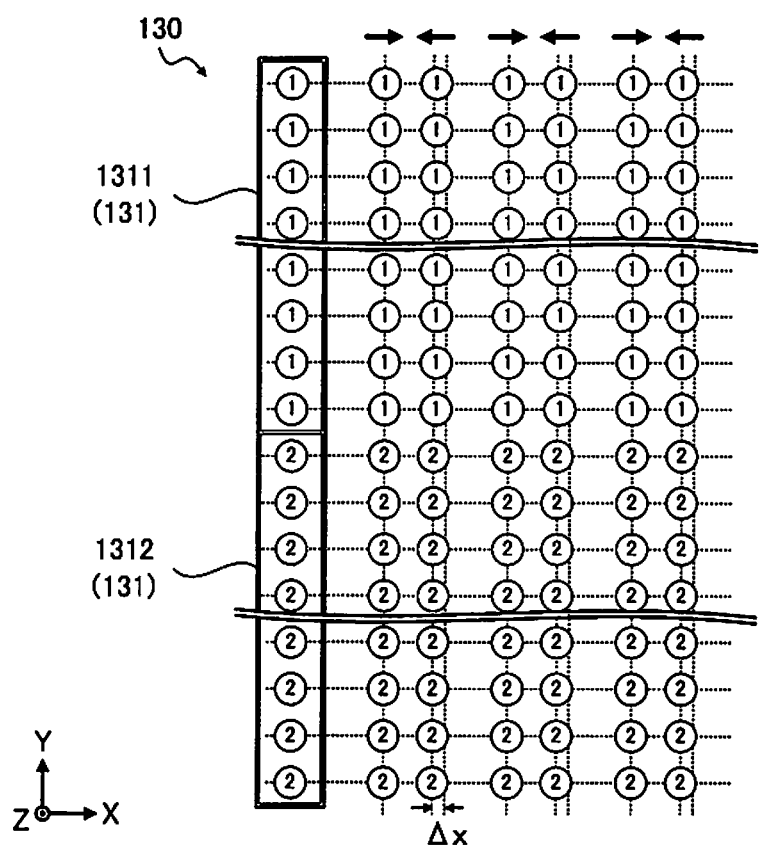
FIG. 7 is an explanatory diagram schematically showing an example when a displacement occurs in a dot formation position between an outward path and a return path when the nozzle column forms dots while reciprocating.

Further, FIG. 7 is an explanatory diagram schematically showing an example when the displacement occurs in the dot formation position between an outward path and a return path when the nozzle column 130 forms the dots while reciprocating in the main scanning direction (the X-axis direction).

For example, when the position in the X direction formed by the nozzle column 130 in the return path (the move toward the −X direction) is shifted as much as Δx toward the −X direction with respect to the position in the X direction formed by the nozzle column 130 in the outward path (the move toward the +X direction), for example, when attempting to record a thin ruled line extending in the Y-axis direction, the width of the ruled line decreases or increases as much as Δx, or the ruled line fails to become a straight line but becomes a zigzag or stepped ruled line in some cases. Further, in the recording of small characters, the characters corrupt to become difficult to decipher in some cases.

Regarding such a displacement of the dots in the X-axis direction (the main scanning direction), it is possible to correct the displacement of the dots by, for example, adjusting the discharge timing from the nozzles in the pass operation.

However, these corrections (adjustments) to the dot displacement require to evaluate the recording characteristic (e.g., an ink discharge characteristic of the recording head 13 (the individual nozzle chips 131 constituting the recording head 13)) of the individual printer 100, and then individually determine the adjustment amount (the correction amount) based on the evaluation result. Further, the printer 100 is required to be provided with a mechanism (e.g., a mechanism for storing the individual adjustment amount (correction amount), a discharge timing adjustment mechanism for each of the nozzle chips 131 reflecting the adjustment amount (the correction amount), and a conveyance amount adjustment mechanism for each pass operation) capable of reflecting the individual adjustment amount (correction amount) thus determined.

Function of Printer Driver in Embodiment 1

Figure 8:
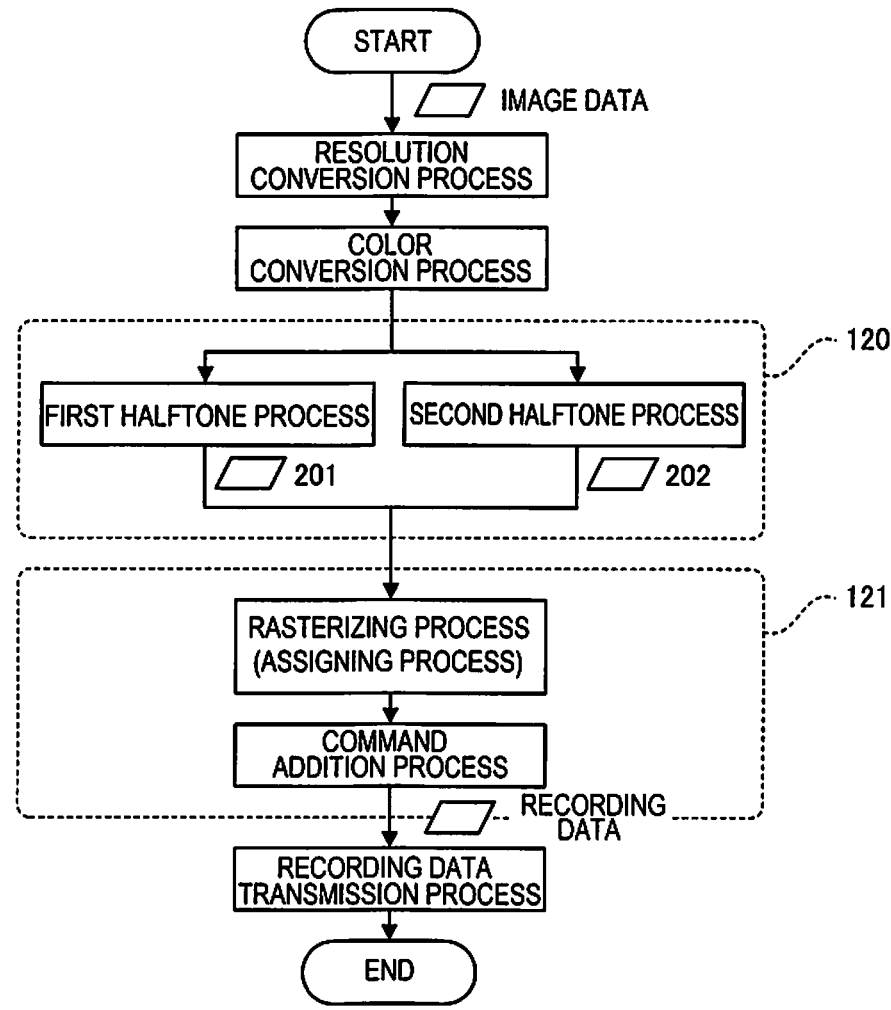
FIG. 8 is a flowchart showing a function of a printer driver provided to an image processing device according to Embodiment 1.

FIG. 8 is a flowchart showing a function of a printer driver provided to the image processing device 110 according to the present embodiment.

The image processing device 110 is provided with halftone processing section 120 for generating a plurality of (specifically two as described below for example) halftone data corresponding to the black (K) ink generated with respect to the same area of the image data based on the image data as a functional section in the printer driver.

Further, the image processing device 110 is provided with an assigning section 121 for assigning each of the halftone data generated by the halftone processing section 120 to the pass operations in the same direction in the reciprocation in the main scanning direction in a "predetermined recording area."

Here, the "predetermined recording area" is an area in which the nozzle chip 131 for discharging the black (K) ink can perform the recording with a single pass operation not accompanied by the conveying operation.

In the image processing in the related art, the halftone process is performed in a lump on the same area (the same target area for generating the recording data) of the image data, and then the halftone data generated there are assigned to the pass operations to thereby generate the recording data as described with reference to FIG. 4.

In contrast, in the image processing in the present embodiment, in the halftone processing section 120, firstly, a plurality of halftone data (specifically, two halftone data, namely a halftone datum 201 for determining the formation state of the dots formed by the nozzle chip 1311, and a halftone datum 202 for determining the formation state of the dots formed by the nozzle chip 1312 as shown in FIG. 8) are generated (the halftone processing process) with respect to the same area (the same target area for generating the recording data). Hereinafter, the halftone process for generating the halftone datum 201 corresponding to the nozzle chip 1311 is referred to as a first halftone process. Further, the halftone process for generating the halftone datum 202 corresponding to the nozzle chip 1312 is referred to as a second halftone process.

Then, the assigning section 121 assigns the halftone datum 201 to the pass operations in the same direction in the reciprocation in the main scanning direction of the nozzle chip 1311 in a predetermined recording area, and assigns the halftone datum 202 to the pass operations in the same direction in the reciprocation in the main scanning direction of the nozzle chip 1312 in the predetermined recording area (an assigning process).

Hereinafter, specific practical examples will be described.

Practical Example 1

Figure 9:
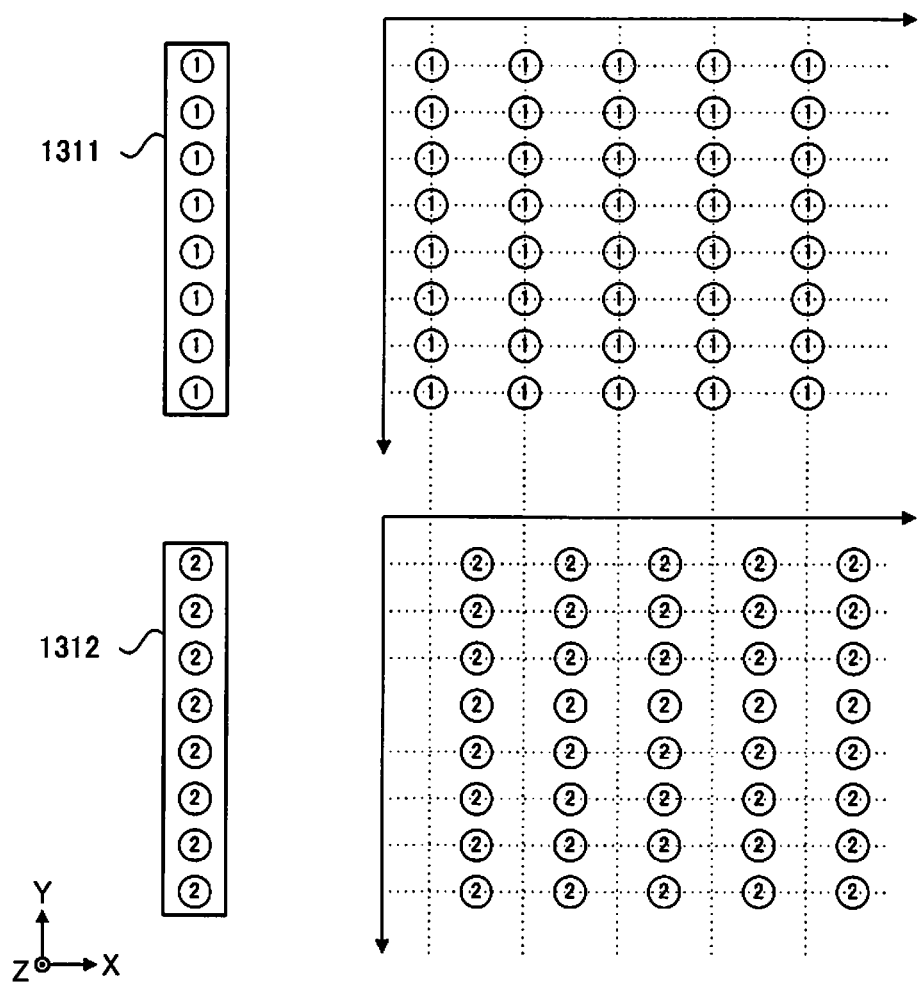
FIG. 9 is a conceptual diagram showing matrix coordinates of the halftone data corresponding respectively to nozzle chips in Practical Example 1.

FIG. 9 is a conceptual diagram showing matrix coordinates of the halftone data (the halftone datum 201, and the halftone datum 202) corresponding respectively to nozzle chips 131 (the nozzle chip 1311, and the nozzle chip 1312) in Practical Example 1.

In the present practical example, in order to simplify the description, each of the nozzle chips 131 is shown so as to be constituted by eight nozzles. Further, as the simplest example, there is shown an example of making the matrix coordinates of the halftone data different from each other as the two halftone processes (the process of generating the halftone datum 201 and the process of generating the halftone datum 202) to be applied to the same area of the image data.

As shown in FIG. 9, in the first halftone process corresponding to the nozzle chip 1311, the halftone data is developed so that the density in the X-axis direction (the main scanning direction) is halved in the matrix coordinate. Further, in the second halftone process corresponding to the nozzle chip 1312, the halftone data is developed so that the density in the X-axis direction (the main scanning direction) is halved similarly to the first halftone process, and so that the developed coordinate positions become the coordinate positions which fill the gap parts of the coordinate halved in density by the development of the first halftone process as shown in FIG. 9.

The halftone processing section 120 as the functional section of the printer driver performs such two halftone processes (the first halftone process and the second halftone process) on the entire area of the same target area for generating the recording data as shown in FIG. 8 to obtain the two halftone data (the halftone datum 201 corresponding to the first halftone process and the halftone datum 202 corresponding to the second halftone process).

Figure 10:
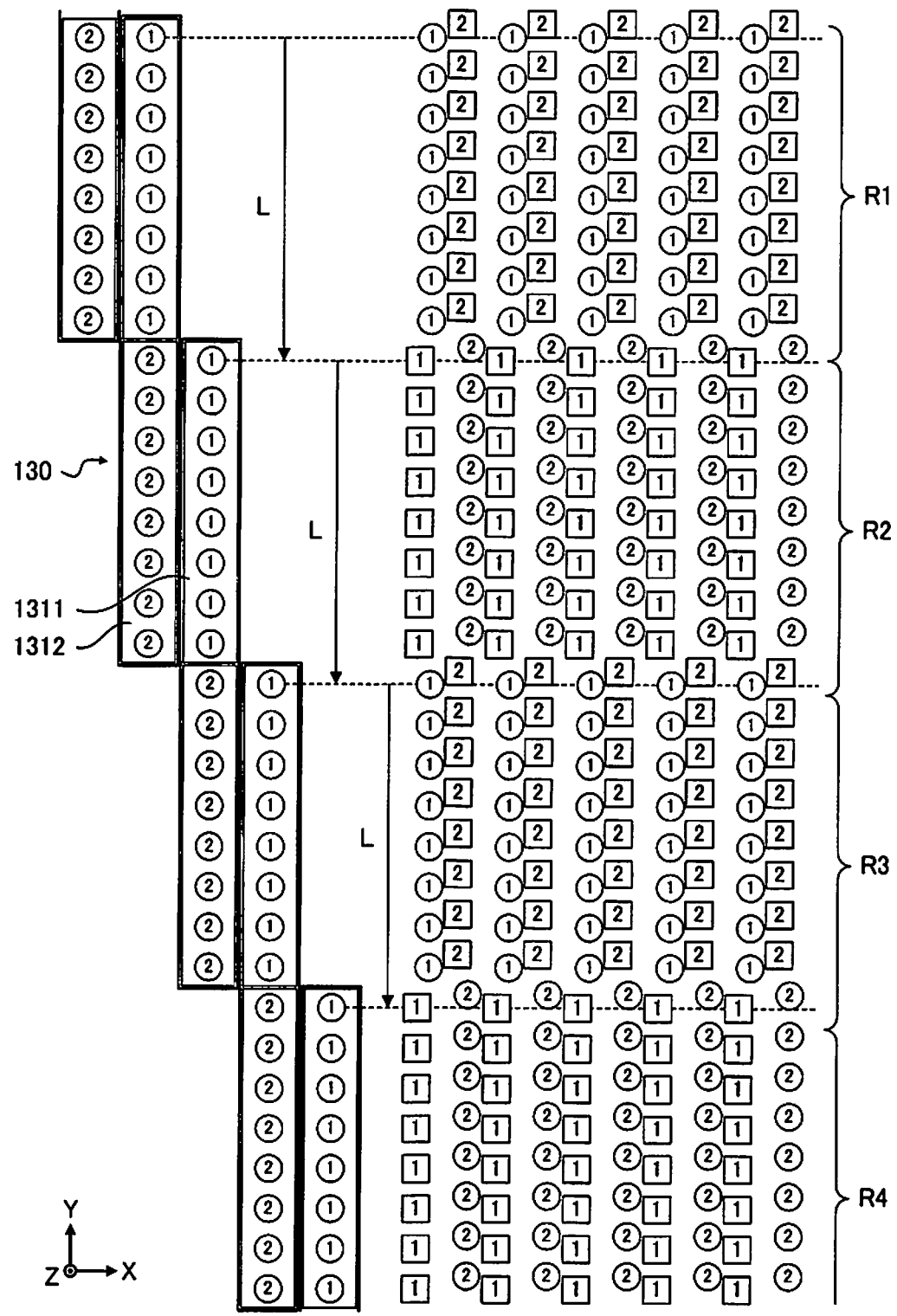
FIG. 10 is a conceptual diagram for explaining an example of an image when performing recording in a printer having a property of a dot displacement.

FIG. 10 is a conceptual diagram for explaining an example of the image when performing recording using these halftone data in the printer 100 having the characteristic of the dot displacement of Δx and Δy described above.

In the right side area of FIG. 10, the dot positions indicated by the numeral of 1 represent the dot positions formed by the nozzle chip 1311 based on the halftone datum 201, and the dot positions indicated by the numeral of 2 represent the dot positions formed by the nozzle chip 1312 based on the halftone datum 202. Further, in the right side area of FIG. 10, the dot positions indicated by the circles represent the dot positions formed by the move (i.e., the pass operation in the outward path) in the outward path direction (the +X direction) in the reciprocation in the main scanning direction (the X-axis direction) of the nozzle column 130, and the dot positions indicated by the squares represent the dot positions formed by the move (i.e., the pass operation in the return path) in the return path direction (the −X direction).

Further, FIG. 10 shows when forming the predetermined recording area Rn with two passes (two pass operations), and recording half in density in the X-axis direction (the main scanning direction) is performed with the first pass operation, then the conveyance of the recording medium 5 is performed with the feed amount L, and then recording is performed so that the part halved in density is filled with the subsequent pass operation.

It should be noted that in FIG. 10, the relative positions of the nozzle column 130 due to the step move with the feed amount L of the recording medium 5 are shown in an oblique direction so that the nozzle column 130 does not overlap. Specifically, there is described in FIG. 10 that the nozzle column 130 moves toward the −Y direction, but in reality, the recording medium 5 moves toward the +Y direction. Further, the positional relationship of the nozzle column 130 in the X-axis direction does not have a meaning.

Further, the areas of Rn (R1 through R4) shown in FIG. 10 are each an area on which the nozzle chip 1311 or the nozzle chip 1312 can perform recording with a single pass operation not accompanied by the conveying operation, and each correspond to the "predetermined recording area" (hereinafter referred to as the predetermined recording area Rn (R1 through R4)).

The assigning section 121 performs the assignment to each pass of the nozzle chip 1311 based on the halftone datum 201 and performs the assignment to each pass of the nozzle chip 1312 based on the halftone datum 202 so as to deal with such recording in two passes to thereby generate the recording data.

Further, as is understood from FIG. 10, each of the individual nozzle chips 131 performs the recording based on the same halftone data throughout the whole of the same area (the whole of the predetermined recording areas R1 through R4 in FIG. 10). Specifically, the nozzle chip 1311 performs the recording based on the halftone datum 201 throughout the whole of the same area, and the nozzle chip 1312 performs the recording based on the halftone datum 202 throughout the whole of the same area.

Further, the assigning section 121 assigns the halftone datum 201 to the pass operations in the same direction in the reciprocation in the main scanning direction (the X-axis direction) of the nozzle chip 1311 in the predetermined recording area Rn, and assigns the halftone datum 202 to the pass operations in the same direction in the reciprocation in the main scanning direction of the nozzle chip 1312 in the predetermined recording area Rn. In other words, the assigning section 121 performs the assignment so that the formation of the dots in the outward path based on the halftone datum 201 and the formation of the dots in the return path based on the halftone datum 201 do not exit in the predetermined recording area Rn in a mixed manner. Further, the assigning section 121 similarly performs the assignment so that the formation of the dots in the outward path based on the halftone datum 202 and the formation of the dots in the return path based on the halftone datum 202 do not exit in the predetermined recording area Rn in a mixed manner.

In other words, the recording on the predetermined recording area Rn is performed as the recording achieved by overlapping the recording by the nozzle chip 1311, which is not affected by the dot formation displacement between the outward path and the return path in the pass operations although the resolution is halved, and the recording by the nozzle chip 1312, which is substantially the same as the recording by the nozzle chip 1311.

Figure 11:
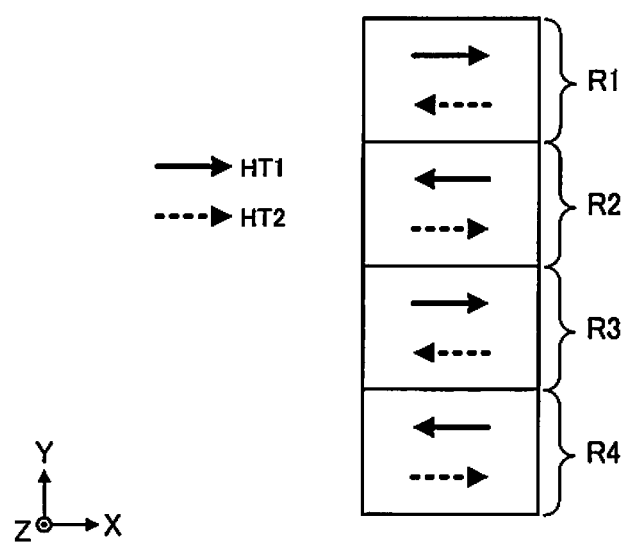
FIG. 11 is a conceptual diagram schematically showing a recording method according to Practical Example 1.

FIG. 11 is a conceptual diagram schematically showing the recording method (the recording method shown in FIG. 10) according to the present practical example.

In FIG. 11, the recording based on the halftone datum 201 by the nozzle chip 1311 is indicated by the solid arrow HT1, and the recording based on the halftone datum 202 by the nozzle chip 1312 is indicated by the dotted arrow HT2. The direction of each of the arrows represents the main scanning direction of the pass operation. For example, it is shown that the recording on the predetermined recording area R1 is performed by the two pass operations, namely the pass operation in the outward path direction (the +X direction) based on the halftone datum 201 by the nozzle chip 1311, and the pass operation in the return path direction (the −X direction) based on the halftone datum 202 by the nozzle chip 1312.

The assigning section 121 is arranged to perform the recording by assigning each of the halftone data to the pass operations throughout the whole of the same area in the image data by at least one of the nozzle chips 131 out of the plurality of nozzle chips 131, and then overlapping the recordings based on the respective halftone data with each other.

Specifically, as shown in FIG. 11, the assigning section 121 is arranged to record the recording image by assigning the halftone datum 201 to the pass operations by the nozzle chip 1311 throughout the whole of the same area (the whole of the predetermined recording areas R1 through R4) in the image data, assigning the halftone datum 202 to the pass operations by the nozzle chip 1312 throughout the same area in the image data, and then overlapping the recording by the nozzle chip 1311 and the recording by the nozzle chip 1312 with each other. Further, in each of the predetermined recording areas Rn, the pass operation of the outward path based on the halftone datum 201 by the nozzle chip 1311 and the pass operation of the return path based on the halftone datum 201 by the nozzle chip 1311 are not mixed with each other, and further, in each of the predetermined recording areas Rn, the pass operation of the outward path based on the halftone datum 202 by the nozzle chip 1312 and the pass operation of the return path based on the halftone datum 202 by the nozzle chip 1312 are not mixed with each other.

According to such a recording method, since the recording is performed by the nozzle chip 1311 throughout the entire area on which the recording is performed, and further, the recording is performed by the nozzle chip 1312 throughout the entire area on which the recording is performed, even when there is a difference in ink discharge characteristic between the nozzle chip 1311 and the nozzle chip 1312, there is no chance for the concentration unevenness generated in the boundary (the boundary in the Y-axis direction) between the nozzle chip 1311 and the nozzle chip 1312 to eccentrically be located, and the influence of the difference in ink discharge characteristic is dispersed in the entire area on which the recording is performed. Therefore, it is possible to perform good recording in which the shading variation due to the part where the dots are densely (closely) arranged and the part where the dots are thinly (separately) arranged in the Y-axis direction as shown in FIG. 6 is difficult to be visually recognized. Further, the halftone datum 201 and the halftone datum 202 are each lower in resolution as described above, but are generated as the image data (e.g., the image data in which the visibility as a character does not deteriorate, or in which the deterioration is suppressed) in which the image of the original image data is maintained, and the recording is achieved by overlapping the images based on the respective halftone data, and therefore, it is possible to perform better recording.

Further, since the directions of the pass operations by each of the nozzle chips 131 (the nozzle chip 1311, the nozzle chip 1312) become the same direction in each of the predetermined recording areas Rn, the recording image based on each of the halftone data (each of the halftone datum 201 and the halftone datum 202) which the respective nozzle chips 131 (the nozzle chip 1311, the nozzle chip 1312) are in charge of can be recorded without being affected by the dot displacement generated by the difference in moving direction of the nozzle column 130 (the nozzle chips 131) in the pass operations in each of the predetermined recording areas Rn. For example, the small character to be recorded in each of the predetermined recording areas Rn can be recorded without deteriorating in the visibility as the character since the image based on each of the halftone data (each of the halftone datum 201 and the halftone datum 202) is recorded without being affected by the dot displacement generated by the difference in the moving direction in the reciprocation of the recording head 13.

Figure 12:
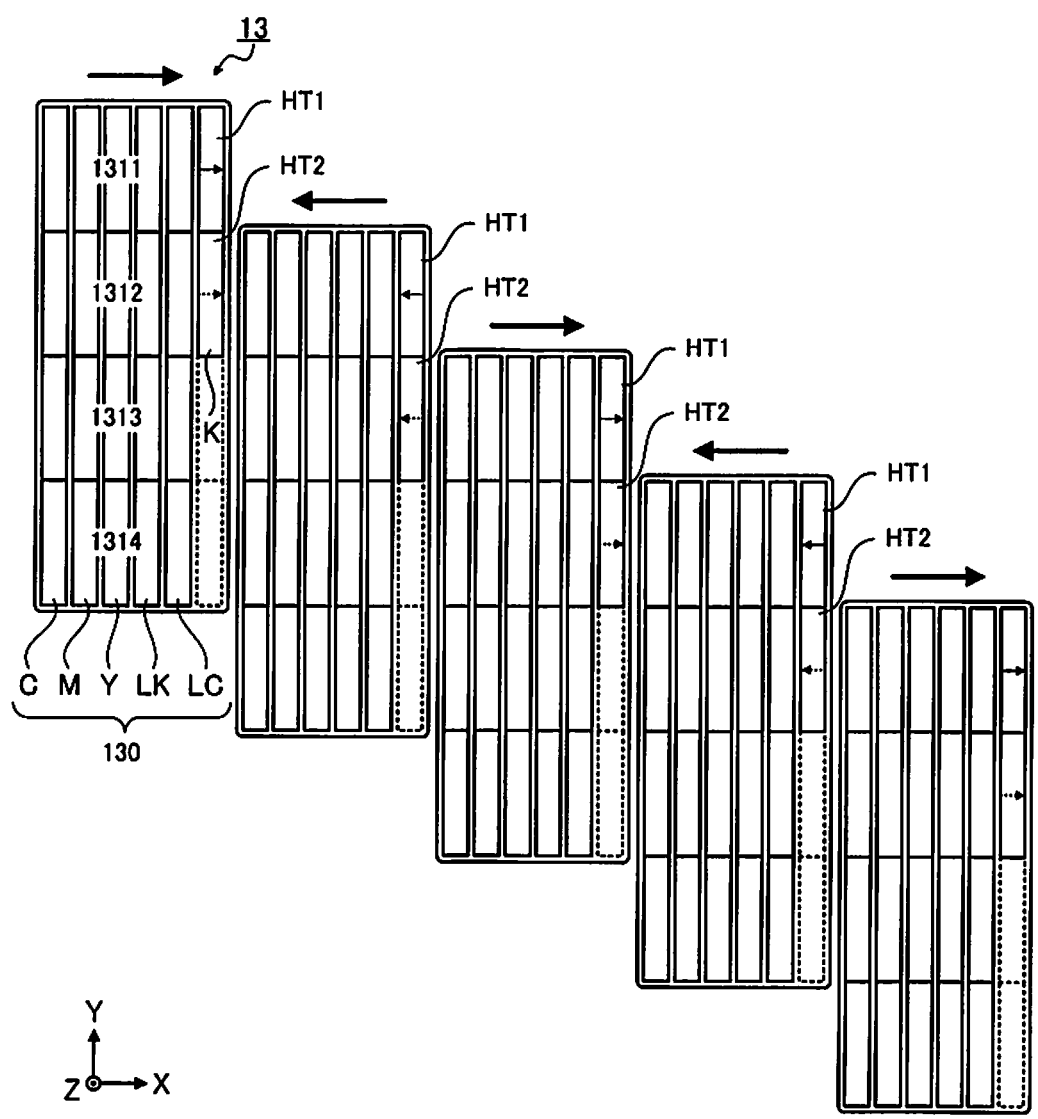
FIG. 12 is a schematic diagram showing a configuration example and a pass operation of a recording head which realizes recording by the recording method according to Practical Example 1 in a full-color printer.

FIG. 12 is a schematic diagram showing a configuration example and the pass operation of the recording head 13 which realizes recording by the recording method according to the present practical example described with reference to FIG. 10 and FIG. 11 in the full-color printer 100. Similarly to FIG. 10, the relative position of the recording head 13 due to the step move with the feed amount of the recording medium 5 is shown in an oblique direction so that the recording head 13 does not overlap.

The recording head 13 is provided with six nozzle columns 130 (the black ink nozzle column K, the cyan ink nozzle column C, the magenta ink nozzle column M, the yellow ink nozzle column Y, the gray ink nozzle column LK and the light cyan ink nozzle column LC), and each of the nozzle columns 130 is constituted by four nozzle chips 131 (nozzle chips 1311 through 1314) unlike the example of the recording head 13 described with reference to FIG. 3.

The five nozzle columns 130 except the black ink nozzle column K (the nozzle column 130 for discharging the ink of black (K) as the "predetermined color") each perform the pass operation based on the recording data generated by the image processing in the related art described with reference to FIG. 4. Specifically, the recording is performed based on the recording data obtained by assigning the halftone datum corresponding to each of the nozzle columns 130 to the respective four nozzle chips 131 (the nozzle chips 1311 through 1314) so that the recording is completed with the four pass operations.

Here, the ink discharged by the five nozzle columns 130 (the cyan ink nozzle column C, the magenta ink nozzle column M, the yellow ink nozzle column Y, the gray ink nozzle column LK and the light cyan ink nozzle column LC) except the black ink nozzle column K corresponds to "ink of a second color," and the nozzles constituting the five nozzle columns 130 except the black ink nozzle column K correspond to a "second nozzle column." Further, the halftone data corresponding respectively to the five nozzle columns 130 except the black ink nozzle column K each correspond to a "second halftone datum."

In other words, the recording head 13 is provided with the second nozzle column for discharging the ink of the second color different from the predetermined color, the assigning section 121 obtains the second halftone datum which is generated with respect to the same area of the image data, and which corresponds to the ink of the second color based on the image data, and assigns the second halftone datum to the pass operations in the same direction, or the outward path direction and the return path direction in the reciprocation in the main scanning direction of the second nozzle column.

Further, although the black ink nozzle column K has the four nozzle chips 131 (the nozzle chips 1311 through 1314) similarly to the other nozzle columns 130, the nozzle chips 1313, 1314 are not used in the recording method according to the present practical example. Therefore, it is also possible for the black ink nozzle column K to have a configuration not provided with the nozzle chips 1313, 1314. In the recording by the black ink nozzle column K, the halftone datum 201 and the halftone datum 202 are generated so that the recording is completed with the two pass operations, and are assigned to the nozzle chips 1311, 1312 as shown in FIG. 10 and FIG. 11.

According to the full-color recording method related to the present practical example shown in FIG. 12, since each of the nozzle chip 1311 and the nozzle chip 1312 performs the recording throughout the entire area on which the recording is performed in the recording with the black (K) ink high in contrast with respect to the white recording medium 5, even when there is a difference in ink discharge characteristic between the nozzle chip 1311 and the nozzle chip 1312, there is no chance for the concentration unevenness generated in the boundary between the nozzle chip 1311 and the nozzle chip 1312 to eccentrically be located, and the influence of the difference in ink discharge characteristic is dispersed in the entire area on which the recording is performed. Therefore, it is possible to perform excellent recording in which the influence is difficult to visually be recognized. Further, in the recording with the black (K) ink, since the directions of the pass operations by each of the nozzle chips 131 (the nozzle chip 1311, the nozzle chip 1312) become the same direction in each of the predetermined recording areas Rn, the recording image which the respective nozzle chips 131 (the nozzle chip 1311, the nozzle chip 1312) are in charge of can be recorded without being affected by the dot displacement generated by the difference in moving direction of the nozzle column 130 in the pass operations in each of the predetermined recording areas Rn. Therefore, in the recording of characters, ruled lines or the like with the black (K) ink high in contrast with the white recording medium 5, it is possible to perform recording higher in quality in which the visibility as characters, and the line quality of the ruled lines can be prevented from degrading.

Further, the color recording with the ink of the colors other than black (K) can efficiently be performed with a larger number of pass operations compared to the black ink.

Practical Example 2

Figure 13:
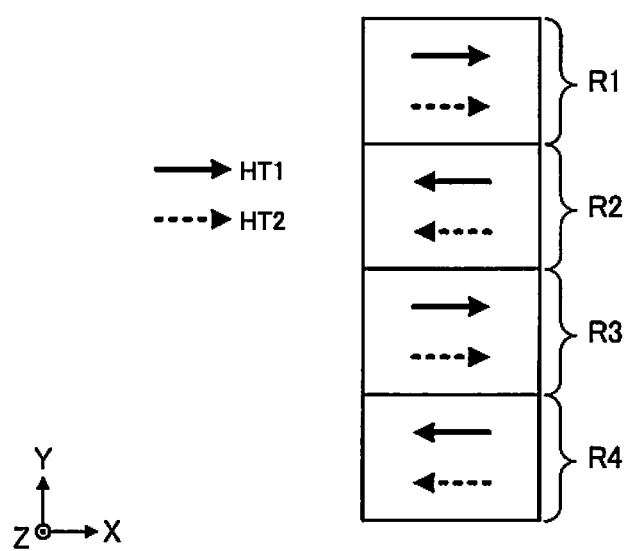
FIG. 13 is a conceptual diagram schematically showing a recording method according to Practical Example 2.

FIG. 13 corresponds to FIG. 11 showing the recording method according to Practical Example 1, and is a conceptual diagram schematically showing the recording method according to Practical Example 2.

In the recording method according to the present practical example, the directions of the pass operations of the nozzle chip 1311 and the nozzle chip 1312 are set to the same direction in each of the predetermined recording areas Rn.

Figure 14:
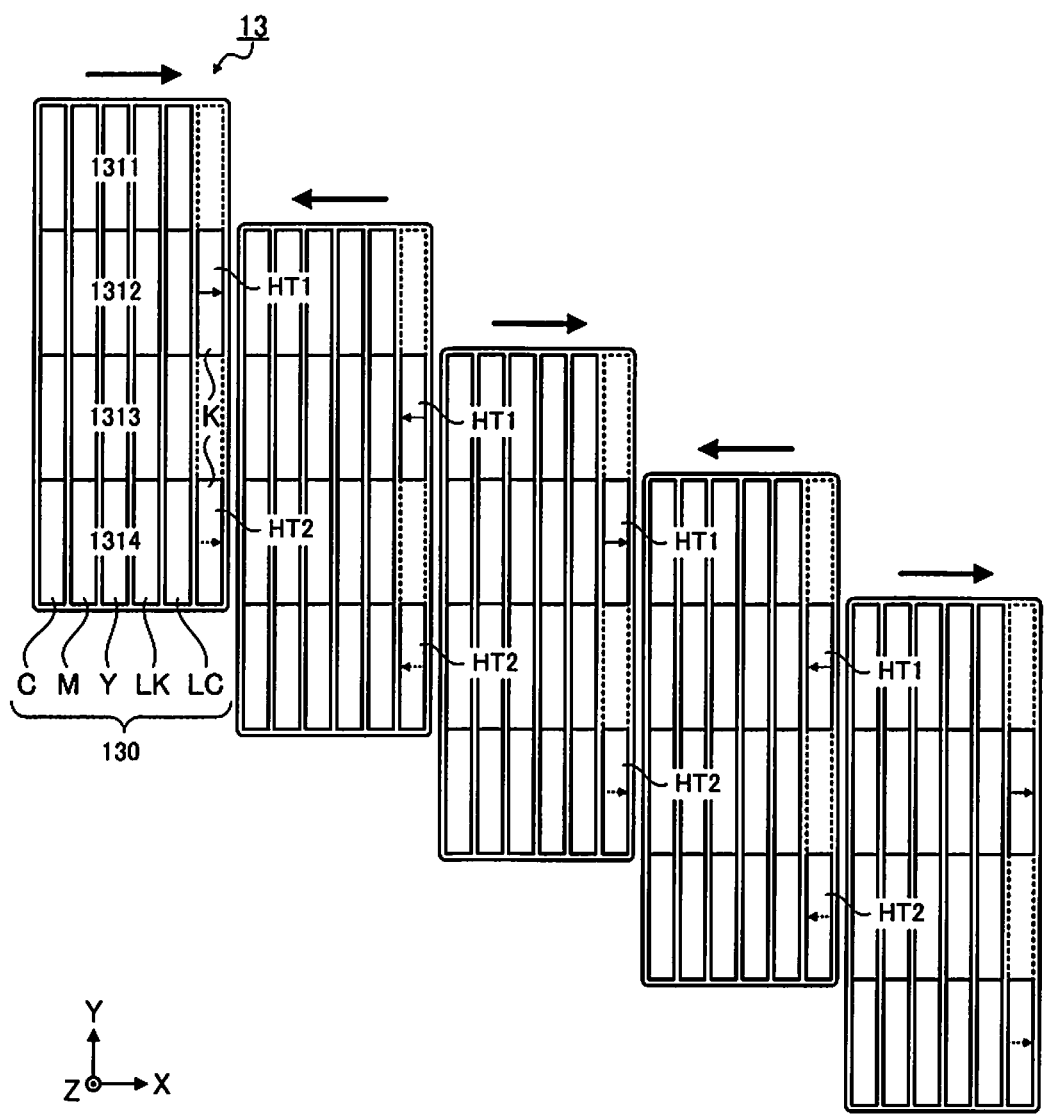
FIG. 14 is a schematic diagram showing a configuration example and a pass operation of a recording head which realizes recording by the recording method according to Practical Example 2 in a full-color printer.

FIG. 14 is a schematic diagram showing a configuration example and a pass operation of the recording head 13 which realizes recording by the recording method according to the present practical example in the full-color printer 100.

The configuration and the recording method of the five nozzle columns 130 (the cyan ink nozzle column C, the magenta ink nozzle column M, the yellow ink nozzle column Y, the gray ink nozzle column LK and the light cyan ink nozzle column LC) except the black ink nozzle column K are the same as in Practical Example 1. Although the black ink nozzle column K has the four nozzle chips 131 (the nozzle chips 1311 through 1314), the nozzle chips 1311, 1313 are not used in the recording method according to the present practical example. Therefore, it is also possible for the black ink nozzle column K to have a configuration not provided with the nozzle chips 1311, 1313. As shown in FIG. 13, in the recording by the black ink nozzle column K, the halftone datum 201 and the halftone datum 202 are generated so that the recording is completed with the two pass operations, and are assigned to the nozzle chips 1312, 1314.

According to the recording method related to the present practical example, since the directions of the pass operations of the nozzle chip 1311 and the nozzle chip 1312 become the same direction in each of the predetermined recording areas Rn, it is possible to perform recording without being affected by the dot displacement generated due to the difference in the moving direction of the pass operations in each of the predetermined recording areas Rn.

Practical Example 3

Figure 15:
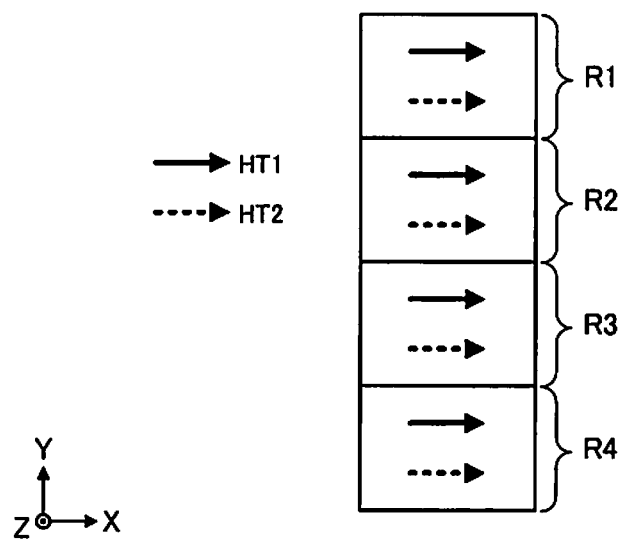
FIG. 15 is a conceptual diagram schematically showing a recording method according to Practical Example 3.

FIG. 15 is a conceptual diagram schematically showing a recording method according to Practical Example 3.

In the recording method according to the present practical example, the directions of the pass operations of the nozzle chip 1311 and the nozzle chip 1312 are set to the same direction in all of the predetermined recording areas Rn. It should be noted that regarding the configuration for performing the recording of the present practical example in the full-color printer 100, the description thereof will be omitted.

According to the recording method related to the present practical example, it is possible to perform good recording in which the shading variation due to the part where the dots are densely arranged and the part where the dots are thinly arranged in the Y-axis direction is difficult to visually be recognized throughout all of the recording areas. Further, the recording can be performed throughout all of the recording areas without being affected by the dot displacement generated due to the difference in moving direction of the pass operations.

Practical Example 4

Figure 16:
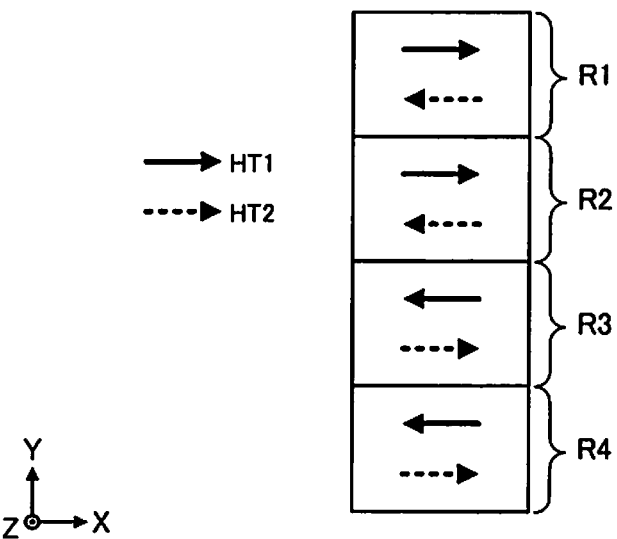
FIG. 16 is a conceptual diagram schematically showing a recording method according to Practical Example 4.

FIG. 16 is a conceptual diagram schematically showing a recording method according to Practical Example 4.

In contrast to Practical Example 1 in which the directions of the pass operations of the nozzle chip 1311 and the nozzle chip 1312 are set to be opposite to each other in the predetermined recording areas Rn adjacent to each other as shown in FIG. 11, in the recording method according to the present practical example, it is arranged that the directions in the predetermined recording areas R1, R2 are the same, and the directions in the predetermined recording areas R3, R4 are the same.

According to the recording method related to the present practical example, since the directions of the pass operations by each of the nozzle chips 131 (the nozzle chip 1311, the nozzle chip 1312) are set to the same direction in the predetermined recording areas R1, R2, or the predetermined recording areas R3, R4, the recording can be performed in a range broader in width in the Y-axis direction compared to the case of Practical Example 1 without being affected by the dot displacement generated due to the difference in moving direction of the nozzle column 130 (the nozzle chips 131) in the pass operations.

Practical Example 5

Figure 17:
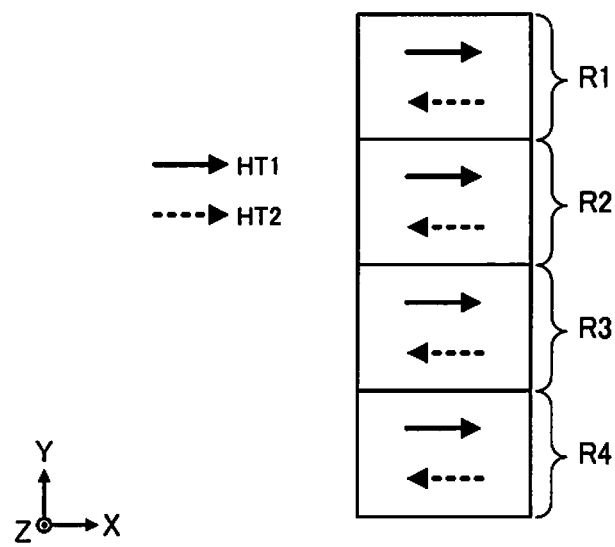
FIG. 17 is a conceptual diagram schematically showing a recording method according to Practical Example 5.

FIG. 17 is a conceptual diagram schematically showing a recording method according to Practical Example 5.

In the recording method according to the present practical example, the directions of the pass operations of the nozzle chip 1311 are set to the same direction in all of the predetermined recording areas Rn. Further, the directions of the pass operations of the nozzle chip 1312 are set to the opposite direction to the direction of the pass operations of the nozzle chip 1311 in all of the predetermined recording areas Rn.

According to the recording method related to the present practical example, since the directions of the pass operations of the nozzle chip 1311 become the same direction throughout all of the recording areas, the recording image which the nozzle chip 1311 is in charge of can be recorded without being affected by the dot displacement generated due to the difference in moving direction of the nozzle column 130 (the nozzle chips 131) in the pass operations throughout all of the recording areas. Further, since the directions of the pass operations of the nozzle chip 1312 become the same direction throughout all of the recording areas, the recording image which the nozzle chip 1312 is in charge of can be recorded without being affected by the dot displacement generated due to the difference in moving direction of the nozzle column 130 (the nozzle chips 131) in the pass operations throughout all of the recording areas.

Practical Example 6

Figure 18:
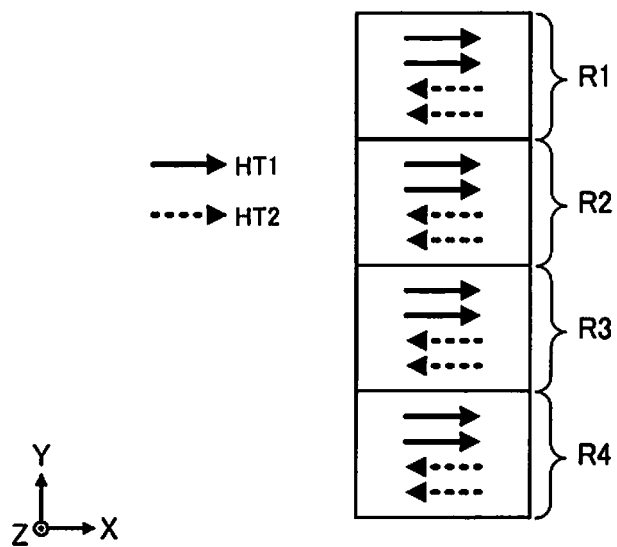
FIG. 18 is a conceptual diagram schematically showing a recording method according to Practical Example 6.

FIG. 18 is a conceptual diagram schematically showing a recording method according to Practical Example 6.

Figure 19:
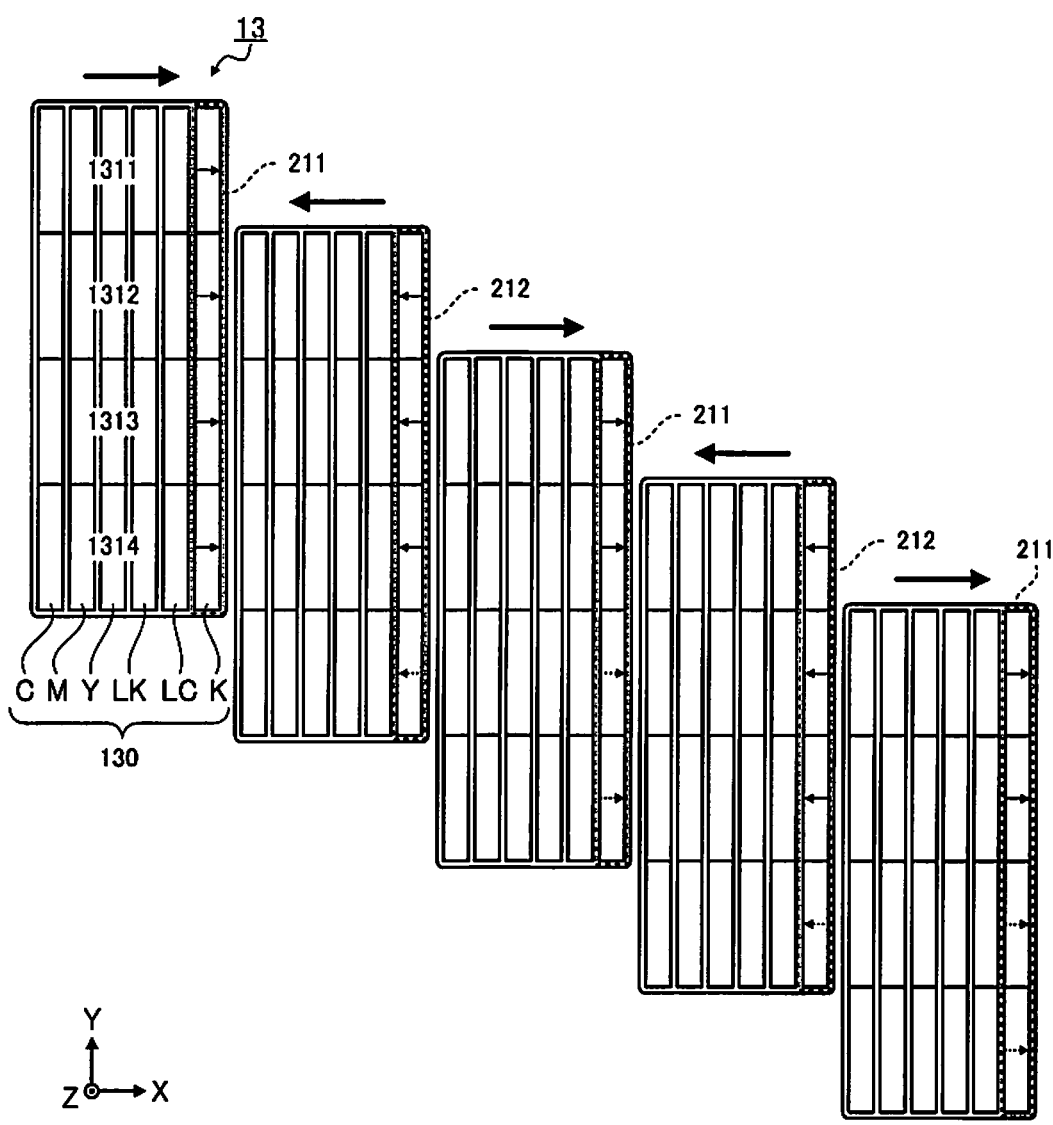
FIG. 19 is a schematic diagram showing a configuration example and a pass operation of a recording head which realizes recording by the recording method according to Practical Example 6 in a full-color printer.
Figure 20:
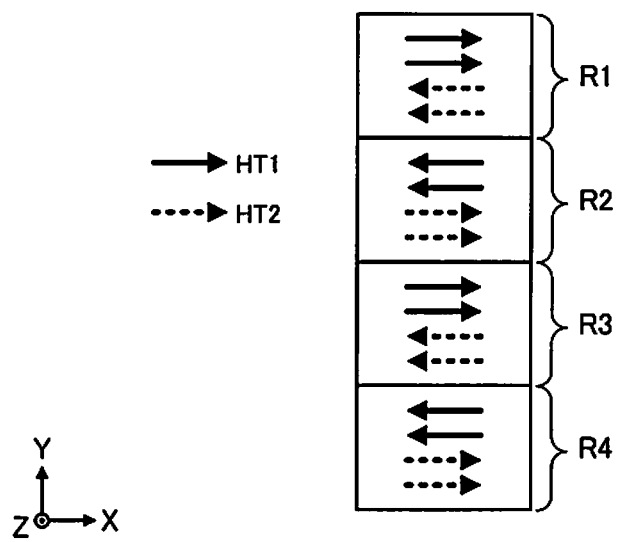
FIG. 20 is a conceptual diagram schematically showing a recording method according to Practical Example 7.
Figure 21:
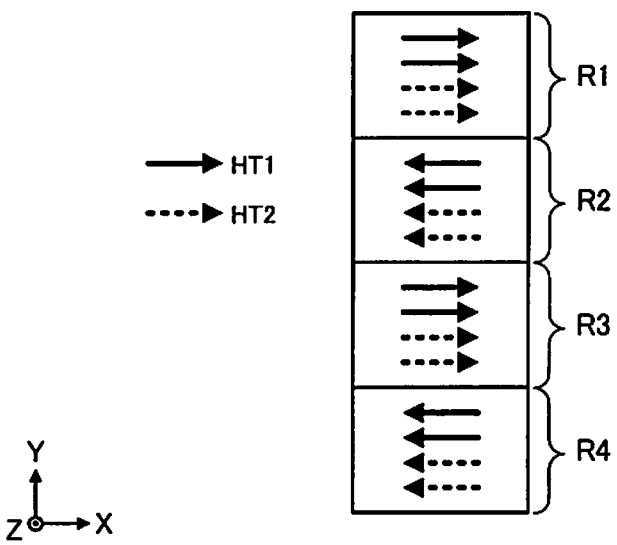
FIG. 21 is a conceptual diagram schematically showing a recording method according to Practical Example 8.
Figure 22:
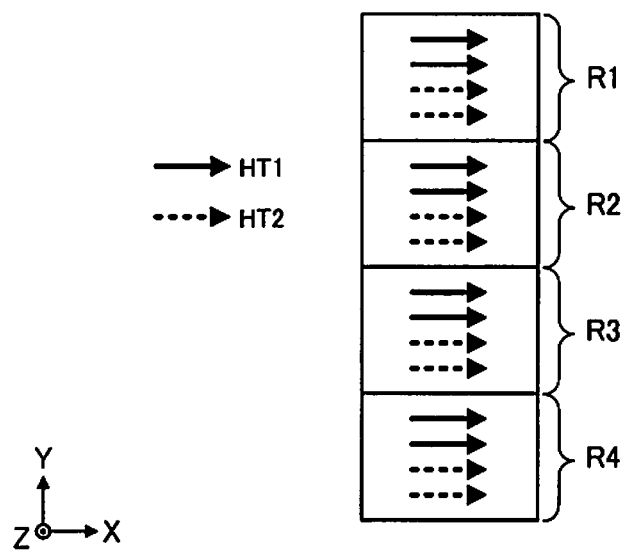
FIG. 22 is a conceptual diagram schematically showing a recording method according to Practical Example 9.
Figure 23:
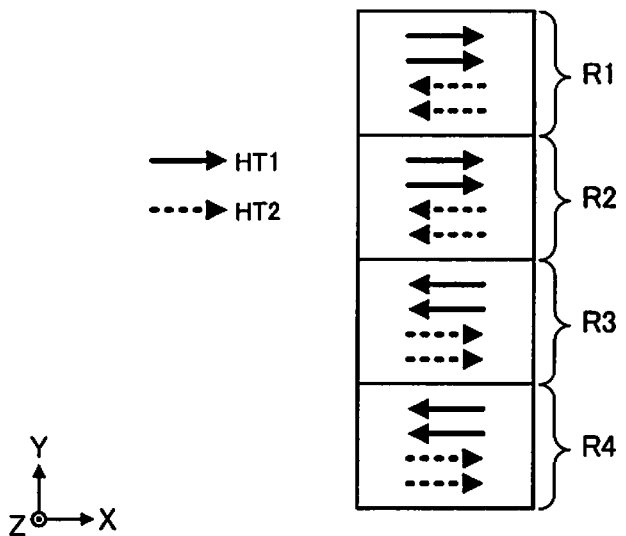
FIG. 23 is a conceptual diagram schematically showing a recording method according to Practical Example 10.

FIG. 19 is a schematic diagram showing a configuration example and a pass operation of the recording head 13 which realizes recording by the recording method according to the present practical example in the full-color printer 100.

In Practical Examples 1 through 5, the halftone datum 201 and the halftone datum 202 are generated and are assigned to the nozzle chips 1311, 1312 so that the recording by the black ink nozzle column K is completed with the two pass operations on the one hand, in the recording method according to the present practical example, it is arranged that the recording by the black ink nozzle column K is completed with four pass operations by the four nozzle chips 1311 through 1314 on the other hand.

The configuration and the recording method of the five nozzle columns 130 (the cyan ink nozzle column C, the magenta ink nozzle column M, the yellow ink nozzle column Y, the gray ink nozzle column LK and the light cyan ink nozzle column LC) except the black ink nozzle column K are the same as in Practical Example 1.

The black ink nozzle column K according to the present practical example has the four nozzle chips 131 (the nozzle chips 1311 through 1314), and it is arranged that the recording by the black ink nozzle column K is completed with the four pass operations as shown in FIG. 18.

Specifically, the halftone processing section 120 generates two halftone data (halftone data 211, 212) with respect to the same target area for generating the recording data. Then, the assigning section 121 assigns the halftone datum 211 to the pass operation in the outward path of the black ink nozzle column K (the nozzle chips 1311 through 1314), and assigns the halftone datum 212 to the pass operation in the return path of the black ink nozzle column K (the nozzle chips 1311 through 1314) so that the recording is completed with the four pass operations shown in FIG. 19. Although in Practical Examples 1 through 5, one halftone datum out of the plurality of halftone data thus generated is applied to the same nozzle chip 131, it is also possible to arrange that the different halftone data are assigned to one nozzle chip 131 respectively in the outward path and the return path as in the present practical example.

According to the recording method related to the present practical example, since the directions of the pass operations in the recording based on the halftone datum 211 become the same direction throughout all of the recording areas, the recording image based on the halftone datum 211 can be recorded without being affected by the dot displacement generated due to the difference in moving direction of the nozzle column 130 (the nozzle chips 131) in the pass operations throughout all of the recording areas. Further, since the directions of the pass operations in the recording based on the halftone datum 212 become the same direction throughout all of the recording areas, the recording image based on the halftone datum 212 can be recorded without being affected by the dot displacement generated due to the difference in moving direction of the nozzle column 130 (the nozzle chips 131) in the pass operations throughout all of the recording areas.

Practical Example 7 Through Practical Example 10

FIG. 20 through FIG. 23 are conceptual diagrams schematically showing recording methods according to Practical Example 7 through Practical Example 10, respectively.

Practical Example 7 through Practical Example 10 correspond respectively to Practical Example 1 through Practical Example 4 which are each arranged so that the recording by the black ink nozzle column K is completed with two pass operations, and are each an example of the case arranged so that the recording is completed with four pass operations. According also to such recording methods, substantially the same advantages can be obtained.

As described hereinabove, according to the recording device, the image processing device and the recording method related to the present embodiment, the following advantages can be obtained.

The recording of the recording image by the nozzle column 130 for discharging the black (K) ink (the ink of the predetermined color) can be performed using a plurality of halftone data separately generated with respect to the same area of the image data. As a result, even when, for example, the nozzle column 130 is constituted by a plurality of heads (nozzle chips each having a plurality of nozzles) different in discharge characteristic in discharging the black (K) ink from each other, by performing the recording on the same area by overlapping the recordings by the individual heads with each other using the halftone data different between the individual heads, it is possible to record the recording image in which a difference in discharge characteristic between the individual heads is difficult to visually be recognized.

Further, in the predetermined recording area, since each of the halftone data which are generated with respect to the same area of the image data, and which correspond to the black (K) ink, is assigned to the pass operations in the same direction in the reciprocation in the main scanning direction, the individual recordings corresponding to the respective halftone data by the black (K) ink can be performed without being affected by the dot displacement generated due to the difference in moving direction of the nozzle column 130 in the pass operations.

As a result, it is possible to arrange that the recording in which the influence of the discharge characteristic is suppressed is performed without performing the evaluation of the discharge characteristic (dot displacement) of the nozzle column 130 for discharging the black (K) ink, the correction based on the evaluation result, and so on. Further, it becomes unnecessary to provide a correction device (e.g., a drive waveform generation data correction device) to each of the nozzle sets (the nozzle chips 131) having a possibility of being different in discharge characteristic from each other, and thus, it becomes possible to reduce the cost. Further, since it is unnecessary to obtain a correction amount according to the ink discharge characteristic of the individual nozzle column 130, there is no chance of taking time for an adjustment.

Further, the recording system 1 is provided with the halftone processing section 120 for generating a plurality of halftone data corresponding to the black (K) ink with respect to the same area of the image data based on the image data. Therefore, it is unnecessary to provide a device (an image processing device) for generating these halftone data outside the recording system 1.

Further, the assigning section 121 assigns each of the halftone data corresponding to the black (K) ink and generated with respect to the same area of the image data based on the image data to the pass operations throughout the whole of the same area of the image data by one nozzle chip 131 out of the plurality of nozzle chips 131, and the recording system 1 performs the recording by overlapping the recordings based on the respective halftone data. As a result, even when there is a difference in discharge characteristic between the individual nozzle chips 131 for discharging the black (K) ink, since the recording images to be recorded by the respective nozzle chips 131 are overlapped throughout the whole of the same area, the difference in discharge characteristic between the nozzle chips 131 is prevented from becoming visible.

As a result, it becomes unnecessary to perform the correction in accordance with the discharge characteristic of the individual nozzle chip 131 in order to suppress the difference in discharge characteristic between the nozzle chips 131 for discharging the black (K) ink. In other words, it becomes unnecessary to obtain the correction amount according to the discharge characteristic of the individual nozzle chip 131 for discharging the black (K) ink, and further, it becomes unnecessary to provide the correction device for performing the correction of the correction amount obtained for each of the nozzle chips 131.

Further, since the recording based on the same halftone datum is performed throughout the whole of the same area for each of the individual nozzle chips 131 for discharging the black (K) ink, and further, the pass operations for the recording are performed in the same direction in the reciprocation in the main scanning direction in a predetermined recording area, it is possible to perform the recording in the predetermined recording area without being affected by the dot displacement generated due to the difference in moving direction of the individual nozzle chip 131.

Further, the predetermined recording area is an area in which the nozzle chip 131 for discharging the black (K) ink can perform the recording in a single pass operation not accompanied by the conveying operation. In other words, the individual recoding by each of the halftone data corresponding to the black (K) ink in the area (the predetermined recording area) on which the nozzle chip 131 can perform the recording with a single pass operation not accompanied by the conveying operation can be performed without being affected by the dot displacement generated due to the difference in moving direction of the nozzle column 130 in the pass operations.

Further, the recording with the ink of the second color different from the predetermined color can be performed with the pass operations in the same direction in the main scanning direction, or the pass operations in the outward path direction and the return path direction, and can therefore efficiently be performed.

It should be noted that the present disclosure is not limited to the embodiment described above, but a variety of modifications or improvements can be provided to the embodiment described above. Some modified examples will be described below. The same constituents as in Embodiment 1 are denoted by the same reference symbols, and the duplicated descriptions will be omitted.

Modified Example 1

In Embodiment 1, the description is presented citing the example when the recording system 1 as a "recording device" is provided with the image processing device 110, and the image processing device 110 is provided with the halftone processing section 120 and the assigning section 121 as shown in FIG. 2, but it is also possible for the "recording device" to have a configuration not including the halftone processing section 120. Specifically, the "recording device" can also be formed of the printer 100 provided with the assigning section 121 as a functional section of the control section 30 without being provided with the image processing device 110.

Specifically, the printer 100 as the "recording device" in Modified Example 1 obtains a plurality of halftone data corresponding to the black (K) ink (the ink of the predetermined color) generated with respect to the same area of the image data based on the image data from an external electronic apparatus (e.g., a personal computer) having a function of the halftone processing section 120 via the interface section 31 provided to the control section 30. Further, the printer 100 is provided with the assigning section 121 for assigning each of the halftone data thus obtained to the pass operations in the same direction in the reciprocation in the main scanning direction in the predetermined recording area.

Even in such a configuration, substantially the same advantages as the advantages described in Embodiment 1 can be obtained.

Modified Example 2

Although the description is presented in Embodiment 1 citing black (K) high in contrast with the recording medium 5 having the white recording surface as an example of the "predetermined color," the "predetermined color" is not limited to black (K). Substantially the same advantages can be obtained providing the predetermined color is high in contrast with a surface color of the recording medium 5.

It should be noted that the term "contrast" sometimes means only a degree of a difference in brightness (tone) or luminance in specific fields, but is used in the present disclosure as the original meaning of contrast, namely as the meaning of "a confrontation (for clearly showing a difference), a comparison, or a difference shown by the confrontation or the comparison." Therefore, the contrast in the description of the present disclosure includes not only a difference in brightness or the like, but also a difference in color, reflectance, gloss (glaze), shading or the like, and means the degree of such a difference, in particular, the degree (discrimination power) of a visual difference. The contrast is a concept including general differences which can visually be confronted such as those low in saturation to those high in saturation, those rich in gloss to those poor in gloss, in addition to, for example, black (K) to the white recording medium 5, and cyan to red. Further, a color high in contrast includes not only those conspicuous in contrast (e.g., cyan to red), but also those in a level in which a contour of a printed part becomes visually clear in comparison to other colors such as colors having a similar tendency (e.g., colors consisting primarily of a hue such as blue through green to red).

In the recording system 1 (see FIG. 2) as Modified Example 2, the "predetermined color" can be designated from the input section 112 provided to the image processing device 110.

Specifically, the image processing device 110 displays the ink types (e.g., cyan (C), magenta (M), yellow (Y), light cyan (Lc), light magenta (Lm), light yellow (Ly) and light black (Lk)) provided to the ink supply section 12 of the printer 100 in a user interface screen which is displayed on the display section 113 by the printer driver, and it is possible for the user to select to thereby designate the "predetermined color" by the input from the input section 112.

The printer driver performs a process in which the nozzle column 130 (the black ink nozzle column K) in Embodiment 1 is replaced with the nozzle column 130 of the ink type thus selected using the functions of the halftone processing section 120 and the assigning section 121 so that the recording with the ink type thus selected becomes the same as the recording with the black ink nozzle column K in Embodiment 1.

By adopting such a configuration, the recording image in which the influence of the dot displacement generated due to the difference in moving direction of the nozzle column 130 in the pass operations can be recorded in the recording with the ink of the color designated from the input section 112. For example, it is possible to change the predetermined color (the color an influence of the dot displacement on which is suppressed) in accordance with a difference in color of the recording medium 5.

It should be noted that it is not required for the "predetermined color" designated from the input section 112 to be limited to a single color. For example, it is also possible to arrange that a plurality of ink colors of ink types can be designated as the ink types of the "predetermined colors" out of the plurality of ink types displayed on the display section 113.

Further, it is also possible to arrange that one color is selected as the "predetermined color," and the ink of the "second color" different from the "predetermined color" is also treated similarly to the ink type of the "predetermined color" when the intensity of the contrast between the color of the recording medium 5 and the second color is higher than the intensity of the contrast between the color of the recording medium 5 and the "predetermined color."

In other words, the assigning section 121 obtains the second halftone datum which is generated with respect to the same area of the image data, and which corresponds to the ink of the second color based on the image data, and assigns the second halftone datum to the pass operations in the same direction in the reciprocation in the main scanning direction of the nozzle column 130 (the second nozzle column) corresponding to the ink of the second color.

By adopting such a configuration, the second halftone datum (the halftone datum which is generated with respect to the same area of the image data based on the image data, and which corresponds to the ink of the second color) is assigned to the pass operations in the same direction in the reciprocation in the main scanning direction of the second nozzle column 130 in the predetermined recording area when the intensity of the contrast between the color of the recording medium 5 and the second color is higher than the intensity of the contrast between the color of the recording medium 5 and the predetermined color. Therefore, the recording with the ink of the second color can be performed without being affected by the dot displacement generated due to the difference in moving direction of the second nozzle column 130 in the pass operations. In other words, in the recording with the ink of the predetermined color and the second color higher in contrast than the predetermined color, the influence of the dot displacement can be suppressed. For example, when performing the recording of characters, ruled lines or the like with the black ink high in contrast with the white recording medium 5, it is possible to perform the recording in which the degradation in visibility as the characters and the line quality of the ruled lines is suppressed.

Modified Example 3

In Embodiment 1, there is described when the "predetermined recording area" is the area on which the nozzle chip 131 for discharging the ink of the predetermined color can perform the recording with a single pass operation not accompanied by the conveying operation, but the "predetermined recording area" can also be an area independent of the configuration of the nozzle chip 131.

Specifically, in the recording system 1 (see FIG. 2) as Modified Example 3, the "predetermined recording area" can be designated from the input section 112 provided to the image processing device 110. More specifically, a length in the sub-scanning direction of the predetermined recording area can be designated from the input section 112. For example, a width longer than the length of the nozzle chip 131 is designated when, for example, the size (the length in the sub-scanning direction) of the area in which it is attempted to perform the recording without being affected by the dot displacement generated due to the difference in moving direction of the nozzle column 130 in the pass operations is slightly longer than the length of the nozzle chip 131. The assigning section 121 performs the assignment on the same halftone data out of the plurality of halftone data generated so that directions of the pass operations become the same in the "predetermined recording area" having that width.

It should be noted that as the designation of the "predetermined recording area," it is preferable that it is possible to further designate the starting point in the sub-scanning direction of the "predetermined recording area" as the designation of the range. That is, by designating the starting point and the length of the "predetermined recording area" in the sub-scanning direction, it is possible to designate the area in which the advantage is exerted in accordance with specific image data to be recorded (e.g., in accordance with the size of the character or the column width).

According to the present modified example, since it is possible to designate the length in the sub-scanning direction of the predetermined recording area by the input from the input section 112, it is possible to change the size of the area in which the recording can be performed without being affected by the dot displacement generated due to the difference in moving direction of the nozzle column 130 in the pass operations in the recording (each of the recordings by the respective halftone data out of the plurality of halftone data corresponding to the ink of the predetermined color) described above. In other words, it is possible to change the method of the recording in accordance with the specification of the recording image such as a character size, or the size of the area in which it is attempted to perform the recording without being affected by the dot displacement generated due to the difference in moving direction of the nozzle column 130 in the pass operations.

Hereinafter, the contents derived from the embodiment and the modified examples described above will be described.

The recording device according to the present disclosure is a recording device configured to record a recording image based on image data by repeating a pass operation in which a nozzle set discharges a liquid while reciprocating relatively to a recording medium in a main scanning direction to form dots on the recording medium, and a conveying operation of relatively moving the nozzle set and the recording medium in a sub-scanning direction crossing the main scanning direction, the recording device including an assigning section configured to obtain a plurality of halftone data which is generated with respect to a same area of the image data based on the image data, and which corresponds to the liquid of a predetermined color, and then assign each of the halftone data obtained to the pass operations in a same direction in reciprocation in the main scanning direction in a predetermined recording area.

According to this configuration, recording of the recording image by the nozzle set for discharging the liquid of the predetermined color can be performed using the plurality of halftone data separately generated with respect to the same area of the image data. As a result, even when, for example, the nozzle set is constituted by a plurality of heads (nozzle chips each having a plurality of nozzles) different in discharge characteristic in discharging the liquid of the predetermined color from each other, by performing the recording on the same area by overlapping the recordings by the individual heads with each other using the halftone data different between the individual heads, it is possible to record the recording image in which a difference in discharge characteristic between the individual heads is difficult to visually be recognized.

Further, in the predetermined recording area, since each of the halftone data which are generated with respect to the same area of the image data, and which correspond to the liquid of the predetermined color, is assigned to the pass operations in the same direction in the reciprocation in the main scanning direction, the individual recordings corresponding to the respective halftone data by the liquid of the predetermined color can be performed without being affected by the dot displacement generated due to the difference in moving direction of the nozzle set in the pass operations.

As a result, it is possible to arrange that the recording in which the influence of the discharge characteristic is suppressed is performed without performing the evaluation of the discharge characteristic (dot displacement) of the nozzle set for discharging the liquid of the predetermined color, the correction based on the evaluation result, and so on. Further, it becomes unnecessary to provide a correction device (e.g., a drive waveform generation data correction device) to each of the nozzle sets having a possibility of being different in discharge characteristic from each other, and thus, it becomes possible to reduce the cost. Further, since it is unnecessary to obtain a correction amount according to the ink discharge characteristic of the individual nozzle set, there is no chance of taking time for an adjustment.

The recording device described above may further include a halftone processing section configured to generate the plurality of halftone data.

According to this configuration, the recording device is provided with the halftone processing section for generating the plurality of halftone data corresponding to the liquid of the predetermined color with respect to the same area of the image data based on the image data. Therefore, it is unnecessary to provide a device (an image processing device) for generating these halftone data outside the recording device.

In the recording device described above, the nozzle set may be constituted by a plurality of nozzle groups, the assigning section may assign each of the halftone data to the pass operations throughout a whole of a same area of the image data by at least one nozzle group out of the plurality of nozzle groups, and the recording image may be recorded by overlapping recordings based on the respective halftone data.

According to this configuration, the assigning section assigns each of the halftone data corresponding to the liquid of the predetermined color and generated with respect to the same area of the image data based on the image data to the pass operations throughout the whole of the same area of the image data by one nozzle group out of the plurality of nozzle groups, and the recording device performs the recording by overlapping the recordings based on the respective halftone data. As a result, even when there is a difference in discharge characteristic between the individual nozzle groups for discharging the liquid of the predetermined color, since the recording images to be recorded by the respective nozzle groups are overlapped throughout the whole of the same area, the difference in discharge characteristic between the nozzle groups is prevented from becoming visible.

As a result, it becomes unnecessary to perform the correction in accordance with the discharge characteristic of the individual nozzle group in order to suppress the difference in discharge characteristic between the nozzle groups for discharging the liquid of the predetermined color. In other words, it becomes unnecessary to obtain the correction amount according to the discharge characteristic of the individual nozzle group for discharging the liquid of the predetermined color, and further, it becomes unnecessary to provide the correction device for performing the correction of the correction amount obtained for each of the nozzle groups.

Further, since the recording based on the same halftone datum is performed throughout the whole of the same area for each of the individual nozzle groups for discharging the liquid of the predetermined color, and further, the pass operations for the recording are performed in the same direction in the reciprocation in the main scanning direction in the predetermined recording area, it is possible to perform the recording in the predetermined recording area without being affected by the dot displacement generated due to the difference in moving direction of the individual nozzle group.

In the recording device described above, the predetermined recording area may be an area in which the nozzle group configured to discharge the liquid of the predetermined color is configured to perform recording with the pass operation not accompanied by the conveying operation.

According to this configuration, the predetermined recording area is an area in which the nozzle group for discharging the liquid of the predetermined color can perform the recording in a single pass operation not accompanied by the conveying operation. In other words, the individual recoding by each of the halftone data corresponding to the liquid of the predetermined color in the area (the predetermined recording area) on which the nozzle group can perform the recording with a single pass operation not accompanied by the conveying operation can be performed without being affected by the dot displacement generated due to the difference in moving direction of the nozzle set in the pass operations.

The recording device described above may further include an input section configured to designate a length in the sub-scanning direction of the predetermined recording area.

According to this configuration, since it is possible to designate the length in the sub-scanning direction of the predetermined recording area by the input from the input section, it is possible to change the size of the area in which the recording can be performed without being affected by the dot displacement generated due to the difference in moving direction of the nozzle set in the pass operations in the recording (each of the recordings by the respective halftone data out of the plurality of halftone data corresponding to the liquid of the predetermined color) described above. In other words, it is possible to change the method of the recording in accordance with the specification of the recording image such as a character size, or the size of the area in which it is attempted to perform the recording without being affected by the dot displacement generated due to the difference in moving direction of the nozzle set in the pass operations.

The recording device described above may further include a second nozzle set configured to discharge a liquid of a second color different from the predetermined color, wherein the assigning section may obtain a second halftone datum which is generated with respect to a same area of the image data based on the image data, and which corresponds to the liquid of the second color, and then assign the second halftone datum to the pass operations in one of a same direction, and a outward path direction and a return path direction in the reciprocation in the main scanning direction of the second nozzle set.

According to this configuration, the recording with the liquid of the second color different from the predetermined color can be performed with the pass operations in the same direction in the main scanning direction, or the pass operations in the outward path direction and the return path direction, and can therefore efficiently be performed.

In the recording device described above, the assigning section may assign the second halftone datum to the pass operations in a same direction in the reciprocation in the main scanning direction of the second nozzle set in the predetermined recording area when an intensity of a contrast between a color of the recording medium and the second color is higher than an intensity of a contrast between the color of the recording medium and the predetermined color.

According to this configuration, the second halftone datum (the halftone datum which is generated with respect to the same area of the image data based on the image data, and which corresponds to the liquid of the second color) is assigned to the pass operations in the same direction in the reciprocation in the main scanning direction of the second nozzle set in the predetermined recording area when the intensity of the contrast between the color of the recording medium and the second color is higher than the intensity of the contrast between the color of the recording medium and the predetermined color. Therefore, the recording with the liquid of the second color can be performed without being affected by the dot displacement generated due to the difference in moving direction of the second nozzle set in the pass operations. In other words, in the recording with the liquid of the predetermined color and the second color higher in contrast than the predetermined color, the influence of the dot displacement can be suppressed.

The recording device described above may further include an input section configured to designate the predetermined color.

According to this configuration, the recording image in which the influence of the dot displacement generated due to the difference in moving direction of the nozzle set in the pass operations can be recorded in the recording with the liquid of the color designated from the input section. For example, it is possible to change the predetermined color (the color an influence of the dot displacement on which is suppressed) in accordance with a difference in color of the recording medium.

The image processing device according to the present disclosure is an image processing device configured to generate recording data for making a recording device perform recording based on image data, the recording device being configured to record a recording image based on the image data by repeating a pass operation in which a nozzle set discharges a liquid while reciprocating relatively to a recording medium in a main scanning direction to form dots on the recording medium, and a conveying operation of relatively moving the nozzle set and the recording medium in a sub-scanning direction crossing the main scanning direction, the image processing device including a halftone processing section configured to generate a plurality of halftone data corresponding to the liquid of a predetermined color with respect to a same area of the image data based on the image data, and an assigning section configured to assign each of the halftone data to the pass operations in a same direction in reciprocation in the main scanning direction in a predetermined recording area.

According to this configuration, recording of the recording image by the nozzle set for discharging the liquid of the predetermined color can be performed using the plurality of halftone data separately generated with respect to the same area of the image data. As a result, even when, for example, the nozzle set is constituted by a plurality of heads (nozzle chips each having a plurality of nozzles) different in discharge characteristic in discharging the liquid of the predetermined color from each other, by performing the recording on the same area by overlapping the recordings by the individual heads with each other using the halftone data different between the individual heads, it is possible to (make the recording device) record the recording image in which a difference in discharge characteristic between the individual heads is difficult to visually be recognized.

Further, in the predetermined recording area, since each of the halftone data which are generated with respect to the same area of the image data, and which correspond to the liquid of the predetermined color, is assigned to the pass operations in the same direction in the reciprocation in the main scanning direction, the individual recordings corresponding to the respective halftone data by the liquid of the predetermined color can be performed without being affected by the dot displacement generated due to the difference in moving direction of the nozzle set in the pass operations.

As a result, it is possible to arrange that the recording in which the influence of the discharge characteristic is suppressed is performed without performing the evaluation of the discharge characteristic (dot displacement) of the nozzle set for discharging the liquid of the predetermined color, the correction based on the evaluation result, and so on. Further, it becomes unnecessary to provide a correction device (e.g., a drive waveform generation data correction device) to each of the nozzle sets having a possibility of being different in discharge characteristic from each other, and thus, it becomes possible to reduce the cost. Further, since it is unnecessary to obtain a correction amount according to the ink discharge characteristic of the individual nozzle set, there is no chance of taking time for an adjustment.

The recording method according to the present disclosure is a recording method in a recording device configured to record a recording image based on image data by repeating a pass operation in which a nozzle set discharges a liquid while reciprocating relatively to a recording medium in a main scanning direction to form dots on the recording medium, and a conveying operation of relatively moving the nozzle set and the recording medium in a sub-scanning direction crossing the main scanning direction, the recording method including a halftone processing process of generating a plurality of halftone data corresponding to the liquid of a predetermined color with respect to a same area of the image data based on the image data, and an assigning process of assigning each of the halftone data to the pass operations in a same direction in reciprocation in the main scanning direction in a predetermined recording area.

According to this method, recording of the recording image by the nozzle set for discharging the liquid of the predetermined color can be performed using the plurality of halftone data separately generated with respect to the same area of the image data. As a result, even when, for example, the nozzle set is constituted by a plurality of heads (nozzle chips each having a plurality of nozzles) different in discharge characteristic in discharging the liquid of the predetermined color from each other, by performing the recording on the same area by overlapping the recordings by the individual heads with each other using the halftone data different between the individual heads, it is possible to record the recording image in which a difference in discharge characteristic between the individual heads is difficult to visually be recognized.

Further, in the predetermined recording area, since each of the halftone data which are generated with respect to the same area of the image data, and which correspond to the liquid of the predetermined color, is assigned to the pass operations in the same direction in the reciprocation in the main scanning direction, the individual recordings corresponding to the respective halftone data by the liquid of the predetermined color can be performed without being affected by the dot displacement generated due to the difference in moving direction of the nozzle set in the pass operations.

As a result, it is possible to arrange that the recording in which the influence of the discharge characteristic is suppressed is performed without performing the evaluation of the discharge characteristic (dot displacement) of the nozzle set for discharging the liquid of the predetermined color, the correction based on the evaluation result, and so on. Further, it becomes unnecessary to provide a correction device (e.g., a drive waveform generation data correction device) to each of the nozzle sets having a possibility of being different in discharge characteristic from each other, and thus, it becomes possible to reduce the cost. Further, since it is unnecessary to obtain a correction amount according to the ink discharge characteristic of the individual nozzle set, there is no chance of taking time for an adjustment.

What is claimed is:

1. A recording device configured to record a recording image based on image data by repeating a pass operation in which a nozzle set discharges a liquid while reciprocating relatively to a recording medium in a main scanning direction to form dots on the recording medium, and a conveying operation of relatively moving the nozzle set and the recording medium in a sub-scanning direction crossing the main scanning direction, the recording device comprising:
    a digital processor configured to obtain a plurality of different sets of halftone data which is generated with respect to a same area of the image data based on the image data, and which corresponds to the liquid of a predetermined color, and then assign the different sets of the halftone data obtained to the pass operations in a same direction in reciprocation in the main scanning direction in a same recording area.

2. The recording device according to claim 1, wherein the digital processor is further configured to generate the different sets of the halftone data.

3. The recording device according to claim 1, wherein the nozzle set is constituted by a plurality of nozzle groups,
    the digital processor assigns the different sets of the halftone data to the pass operations throughout a whole of a same area of the image data by at least one nozzle group out of the plurality of nozzle groups, and
    the recording image is recorded by overlapping recordings based on the respective halftone data.

4. The recording device according to claim 3, wherein the same recording area is an area in which the nozzle group configured to discharge the liquid of the predetermined color is configured to perform recording with the pass operation not accompanied by the conveying operation.

5. The recording device according to claim 1, further comprising:
    an input interface configured to designate a length in the sub-scanning direction of the same recording area.

6. The recording device according to claim 1, further comprising:
    a second nozzle set configured to discharge a liquid of a second color different from the predetermined color, wherein
    the digital processor obtains a second halftone datum which is generated with respect to a same area of the image data based on the image data, and which corresponds to the liquid of the second color, and then assign the second halftone datum to the pass operations in one of a same direction, and an outward path direction and a return path direction in the reciprocation in the main scanning direction of the second nozzle set.

7. A recording device configured to record a recording image based on image data by repeating a pass operation in which a nozzle set discharges a liquid while reciprocating relatively to a recording medium in a main scanning direction to form dots on the recording medium, and a conveying operation of relatively moving the nozzle set and the recording medium in a sub-scanning direction crossing the main scanning direction, the recording device comprising:
    a digital processor configured to obtain a plurality of different sets of halftone data which is generated with respect to a same area of the image data based on the image data, and which corresponds to the liquid of a predetermined color, and then assign the different sets of the halftone data obtained to the pass operations in a same direction in reciprocation in the main scanning direction in a predetermined recording area; and
    a second nozzle set configured to discharge a liquid of a second color different from the predetermined color, wherein
    the digital processor obtains a second halftone datum which is generated with respect to a same area of the image data based on the image data, and which corresponds to the liquid of the second color, and then assign the second halftone datum to the pass operations in one of a same direction, and an outward path direction and a return path direction in the reciprocation in the main scanning direction of the second nozzle set, and
    the digital processor assigns the second halftone datum to the pass operations in a same direction in the reciprocation in the main scanning direction of the second nozzle set in the predetermined recording area when an intensity of a contrast between a color of the recording medium and the second color is higher than an intensity of a contrast between the color of the recording medium and the predetermined color.

8. The recording device according to claim 1, further comprising:
    an input interface configured to designate the predetermined color.

9. An image processing device configured to generate recording data for making a recording device perform recording based on image data, the recording device being configured to record a recording image based on the image data by repeating a pass operation in which a nozzle set discharges a liquid while reciprocating relatively to a recording medium in a main scanning direction to form dots on the recording medium, and a conveying operation of relatively moving the nozzle set and the recording medium in a sub-scanning direction crossing the main scanning direction, the image processing device comprising:
    a digital processor configured to generate a plurality of different sets of halftone data corresponding to the liquid of a predetermined color with respect to a same area of the image data based on the image data,
    the digital processor being further configured to assign the different sets of the halftone data to the pass operations in a same direction in reciprocation in the main scanning direction in a same recording area.

10. A recording method in a recording device configured to record a recording image based on image data by repeating a pass operation in which a nozzle set discharges a liquid while reciprocating relatively to a recording medium in a main scanning direction to form dots on the recording medium, and a conveying operation of relatively moving the nozzle set and the recording medium in a sub-scanning direction crossing the main scanning direction, the method comprising:

generating a plurality of different sets of halftone data corresponding to the liquid of a predetermined color with respect to a same area of the image data based on the image data; and assigning the different sets of the halftone data to the pass operations in a same direction in reciprocation in the main scanning direction in a same recording area.

* * * * *